(12) United States Patent
Kazemzadeh et al.

(10) Patent No.: US 10,088,662 B2
(45) Date of Patent: Oct. 2, 2018

(54) SYSTEM, METHOD AND APPARATUS FOR ULTRA-RESOLVED ULTRA-WIDE FIELD-OF-VIEW MULTISPECTRAL AND HYPERSPECTRAL HOLOGRAPHIC MICROSCOPY

(71) Applicants: Farnoud Kazemzadeh, Waterloo (CA); Alexander Sheung Lai Wong, Waterloo (CA)

(72) Inventors: Farnoud Kazemzadeh, Waterloo (CA); Alexander Sheung Lai Wong, Waterloo (CA)

( * ) Notice: Subject to any disclaimer, the term of this patent is extended or adjusted under 35 U.S.C. 154(b) by 331 days.

(21) Appl. No.: 14/963,662

(22) Filed: Dec. 9, 2015

(65) Prior Publication Data

US 2016/0320602 A1    Nov. 3, 2016

Related U.S. Application Data

(60) Provisional application No. 62/155,416, filed on Apr. 30, 2015.

(51) Int. Cl.
*G02B 21/36* (2006.01)
*G02B 21/00* (2006.01)
(Continued)

(52) U.S. Cl.
CPC ....... *G02B 21/365* (2013.01); *G02B 21/0056* (2013.01); *G02B 21/0064* (2013.01);
(Continued)

(58) Field of Classification Search
CPC ...... G02B 21/365; G02B 21/14; G02B 27/58; G02B 21/0056; G02B 21/0064;
(Continued)

(56) References Cited

U.S. PATENT DOCUMENTS 4,950,880 A * 8/1990 Hayner ................... G01S 7/497
250/201.9
6,262,818 B1 * 7/2001 Cuche ................. G03H 1/0443
359/10

(Continued)

*Primary Examiner* — Michael P Lapage
(74) *Attorney, Agent, or Firm* — Tai W. Nahm; Miller Thomson LLP

(57) ABSTRACT

There is disclosed a novel system and method for achieving ultra-resolution, ultra-wide field-of-view multispectral and hyperspectral holographic microscopy and quantitative phase contrast microscopy. In an embodiment, the method comprises: providing a stationary illumination source; acquiring a plurality of low-resolution holograms of an image subject from different locations utilizing a subpixel sensor-scanning synthetic aperture mechanism whereby a detector scanning translationally, radially and/or rotationally; processing the acquired holograms utilizing a processing algorithm corresponding to the scanning motion of the detector used to acquire the holograms; and reconstructing a subpixel ultra-resolution image of the image subject based on the processed holograms; whereby, a desired synthetic aperture is achieved without loss of resolution. The multispectral and hyperspectral aspect is achieved in the novel system and method by use of different combination of illumination sources (i.e., LEDs, laser sources, broadband lamps, etc.) and wavelength selection mechanisms (i.e., bandpass spectral filters, acousto-optical and liquid crystal tunable filters, a dispersing element, etc.).

11 Claims, 16 Drawing Sheets

(51) Int. Cl.
    *G03H 1/08*       (2006.01)
    *G02B 21/14*     (2006.01)
    *G02B 27/58*     (2006.01)
    *G03H 1/00*       (2006.01)
    *G02B 21/26*     (2006.01)
    *G03H 1/04*       (2006.01)

(52) U.S. Cl.
    CPC ............. *G02B 21/14* (2013.01); *G02B 27/58* (2013.01); *G03H 1/0443* (2013.01); *G03H 1/0866* (2013.01); *G02B 21/0032* (2013.01); *G02B 21/26* (2013.01); *G03H 2001/005* (2013.01); *G03H 2001/046* (2013.01); *G03H 2226/11* (2013.01); *G03H 2240/56* (2013.01)

(58) Field of Classification Search
    CPC .. G02B 21/26; G02B 21/0032; G03H 1/0443; G03H 1/0866; G03H 2226/11; G03H 2240/56; G03H 2001/046; G03H 2001/005
    See application file for complete search history.

(56) References Cited

U.S. PATENT DOCUMENTS

| | | | |
|---|---|---|---|
| 2016/0259297 A1* | 9/2016 | Sato ................. | G02B 21/365 |
| 2016/0305761 A1* | 10/2016 | Girshovitz ......... | G01B 9/02028 |
| 2017/0220000 A1* | 8/2017 | Ozcan ................ | G03H 1/0005 |

* cited by examiner

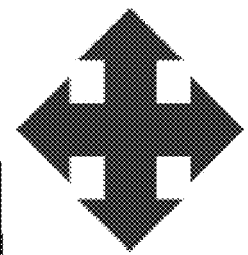
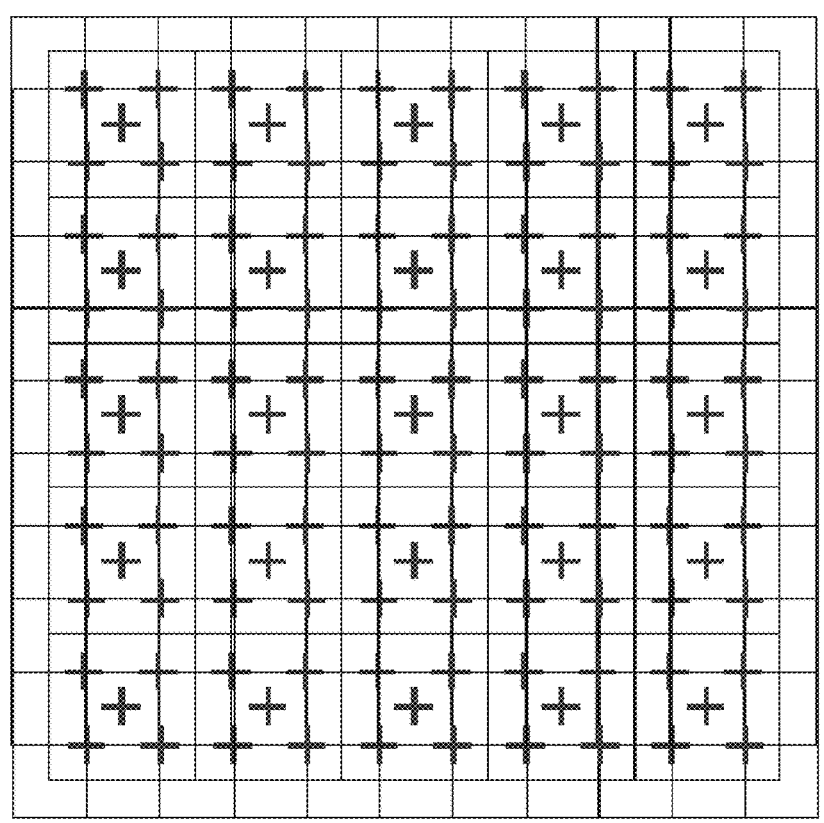
FIG. 3

SYSTEM, METHOD AND APPARATUS FOR ULTRA-RESOLVED ULTRA-WIDE FIELD-OF-VIEW MULTISPECTRAL AND HYPERSPECTRAL HOLOGRAPHIC MICROSCOPY

FIELD OF THE INVENTION

The present disclosure relates generally to the fields of micro-scale and nano-scale multispectral and hyperspectral holographic microscopic imaging and quantitative phase contrast microscopic imaging.

BACKGROUND

Optical microscopy has been and is currently a widely used imaging technique for many fields of research and technology. Various developments are underway in the field of optical microscopy, and two areas of development have been to try to increase the field-of-view (FOV) of optical microscopes in order to obtain a wider angle image of the subject being imaged, and to try to increase imaging resolution in order to see more details in the subject being imaged. However, using conventional methods, in order to significantly increase the FOV of an image in an optical microscope, the imaging resolution suffers as these two parameters are inversely proportional. Therefore, using conventional methods, as one attempts to further increase the FOV, the corresponding imaging resolution decreases. Vice versa, using conventional methods, as one attempts to further increase the imaging resolution, the corresponding FOV decreases.

There also exists fundamental physical factors that limit improvement using conventional methods, such as the diffraction limit, optical aberrations on small scales, and manufacturability of detectors with a sufficiently large active sensor area while maintaining performance parameters such as the noise floor, bit depth, pixel size.

Therefore, what is needed is a technical solution which addresses at least some of the limitations in the prior art, in order to achieve a significant increase in FOV while achieving a very high imaging resolution and while addressing various image degradation resulting from noise and aberrations.

SUMMARY

As noted above, the present disclosure relates generally to the fields of micro-scale and nano-scale multispectral and hyperspectral holographic microscopic imaging and quantitative phase contrast microscopic imaging.

Generally, the sensing system and methods described herein illustrates the use of an ultra-resolution technique to enhance the spatial or lateral resolution of holographic microscopy by any desirable factor, since a combination of different means of performing USAHM can be used to capture low-resolution holograms at any subpixel displacement. The gain in resolution is accompanied by an unprecedented gain in FOV which can be virtually any desirable size and larger than the active sensing area of the detector used. The plurality of low-resolution holograms comprising the large FOV and subpixel displacements are algorithmically assembled and processed to create an ultra-resolution ultra-wide FOV intensity and quantitative phase contrast microscopy (QPCM) image of a sample.

The present system, method and apparatus involves holographic microscopy and quantitative phase contrast microscopy (QPCM) utilizing subpixel scanning of the sensor to perform lensed or lens-free synthetic aperture imaging to achieve ultra-resolution imaging and a large, ultra-wide FOV.

In order to address the various limitations in the prior art, the present system, method and apparatus achieves ultra-resolved, ultra-wide field-of-view multispectral and hyperspectral holographic microscopy utilizing different sensor-scanning synthetic aperture techniques and light source apparatuses. Unlike existing scanning illumination aperture techniques, the present system, method and apparatus provides increased imaging resolution in conjunction with increases in the FOV of the microscope by any desirable factor that is actually greater than the size of the detector chip. The present system, method and apparatus also provides quantitative phase contrast microscopy (QPCM) at both increased imaging resolution and increased FOV. Additionally, the present system, method and apparatus provides spectral information beyond the commonly used broadband red, green, blue wavelengths by sampling the optical wavelengths more systematically and at smaller wavelength intervals, utilizing wavelengths ranging from the ultraviolet wavelengths and the near Infra-red wavelengths.

For the purposes of the present discussion, the term 'multispectral' (MS) imaging refers to capturing spectral information, still or dynamic images, in less than five bands. The term 'hyperspectrar' (HS) imaging as referring to capturing spectral information, still or dynamic images, in five bands or more. Note that theoretically no lower or upper limit exists on the number of spectral bands used in an HS system, therefore the transition boundary between an MS and an HS system is not well defined. The number of unique spectral image data is determined by the spectral resolution of the illumination device. The terms 'ultra-resolution' and 'ultra-resolved' refers to achieving imaging resolution beyond the pixel pitch of the detector in the imaging system.

More generally, ultra-resolution is achieved by a sensor-scanning synthetic aperture method where the detector is scanned translationally and/or radially and/or rotationally and/or randomly to capture one or more holograms at each new location of the detector in the scan while keeping the illumination aperture stationary. Illustrative examples of translational, radial, and polar/rotational movements of the detector are shown and discussed in further detail below.

In an embodiment, scan steps are carried out to achieve subpixel displacement of the detector and therefore, by combining the low-resolution holograms captured at the different scan steps, a much higher resolution ("ultra-resolution") hologram with larger ultra-wide FOV can be created and used for reconstruction. The term "synthetic aperture" as presently used refers to the fact that each low-resolution hologram observed on the detector is simulating the movement of the illumination aperture, but in fact this aperture is remaining stationary, hence a "synthetic aperture".

As discussed in further detail below, various embodiments of an ultra-resolved synthetic aperture holographic microscope ("USAHM") are illustrated. With the USAHM, the present system and method is able to capture micro-scale and nano-scale images at different and selectable spectral bands (central wavelength and spectral bandwidth) and at a higher imaging resolution with the ability to select a FOV that is greater than the detector active area using a true synthetic aperture approach for hologram capture. The invention is accompanied with advanced image processing algorithms for reconstruction of the holographic data into image data.

In general terms, the apparatus in accordance with various embodiments may include one or more of the following: 1) a spectral illumination source with capability of central wavelength and spectral bandwidth selection, illuminating the target through an aperture (i.e., a pinhole) or via a waveguide (i.e., an optical fiber); 2) a sample handling platform on which the samples can be positioned securely and accurately along the optical axis of the system between the illumination source and the detector; 3) a monochromatic or a color (combination of a monochromatic detector with RGB Bayer filter) CCD or CMOS detector; 4) a scanning platform that is capable of moving the detector translationally (TranUSAHM) and/or radially (RadUSAHM) and/or rotationally (PolUSAHM) and/or randomly in plurality of positions enabling synthetic aperture scanning as well as locating the detector axially, which enables enhanced holographic microscopy and enhanced QPCM; 5) a processing unit accompanied with processing techniques and algorithms to reconstruct holograms, obtain amplitude (intensity) and phase information from the holograms, and reconstruct the amplitude (intensity) images and the QPCM images.

Alternatively, a lens can be employed in the system, as described above, and will act to further increase the spatial resolution of the system compared to the system without a lens, at the cost of requiring a larger number of sensor scans to achieve the same FOV as the system without a lens.

In all of the illustrative embodiments, the detector is located on moveable platforms which are capable of motion in the lateral X and Y directions, axial Z direction, as well as the capability to rotate the aforementioned detector about the center of the detector chip. The lateral displacement, in the X and Y directions, may be done in a sequential manner (for example an X displacement followed by Y displacement) enabling TranUSAHM, or in a simultaneous manner (for example X and Y displacement together) enabling RadUSAHM. The rotational displacement, PolUSAHM, may be done at each new lateral location. The three aforementioned synthetic aperture mechanisms may be used concurrently or individually, nonetheless enabling ultra-resolution holographic microscopy and ultra-resolution QPCM via hologram acquisitions at subpixel shifts of the detector. The three aforementioned synthetic aperture mechanisms may also be used concurrently in a random fashion to achieve random movements of the detector for synthetic aperture scanning. The axial displacement, i.e. in the Z direction, may be used at each new lateral location for enhanced ultra-resolved holographic microscopy and enhanced ultra-resolved QPCM. With the exception of the axial displacement, all other displacements of the detector in the system will increase the FOV of the microscope.

In an embodiment, using the rotational moveable platform only, the detector's rotational axis may be placed off of the center of the detector hence the FOV and the lateral resolution can be simultaneously increased while hologram ultra-resolution acquisition is performed using the PolUSAHM approach.

The choice of the aforementioned synthetic aperture mechanisms to use depends on the capabilities of the moveable platforms used, the desired image resolution, the desired FOV, and/or desired imaging acquisition speed.

In all illustrative embodiments, the sample may be placed on a microscope slide or a microscope slide cover slip made of materials such as glass or quartz and positioned at minimal separation distance from the detector array. The microscope slide or the cover slip may be mounted using a sample holding mechanism that is capable of axial displacement, such as a moveable platform, for precision control over the location of the sample.

In another embodiment, the microscope objective lens is situated above the detector and is affixed to the moveable platform, thereby being scanned along with the detector in USAHM. The focal point of the microscope objective may be located at the surface of the microscope slide or it may be located on a screen which is displaying the interferometric diffraction pattern of the sample, in a cinematic fashion.

With regards to the illumination source, in an embodiment, the illumination source may be integrated into the microscope's main-frame and be placed behind the illumination aperture. In other embodiments the illumination source may be placed as its own entity and used in combination with an optical waveguide (i.e., an optical fiber) for delivery of the light to the microscope's main frame.

In some illustrative embodiments, the illumination source may be a single or a series of LEDs, with or without narrow bandpass spectral transmission filters, that may be turned on simultaneously or sequentially imposing light on the illumination aperture, or a single or a series of laser sources that may be turned on simultaneously or sequentially imposing light on the illumination aperture, or a single or a series of or a scanning grating monochromer (wavelength selector) in which the grating in a spectrometer is placed on a rotational moveable platform which allows for rotation of the grating in order to superpose a desired central wavelength on the illumination aperture, or a nano-photonic ring-resonator spectrograph placed directly at the illumination aperture of the system [27].

In other illustrative embodiments, the illumination source may be a single or a series of LEDs, with or without narrow bandpass spectral transmission filters, that may be turned on simultaneously or sequentially to illuminate the entrance aperture of an optical waveguide, or a single or a series of laser sources that may be turned on simultaneously or sequentially to illuminate the entrance aperture of an optical waveguide, or a tunable laser source which would allow for a range of laser wavelengths coupled directly into an optical waveguide, or a broadband light source such as a Halogen or Halogen-Tungsten or a Xenon lamp can be used in combination with 1) a single or a series of narrow bandpass spectral transmission filter(s); 2) an acousto-optical tunable filter; 3) a liquid crystal tunable filter; to illuminate the entrance aperture of an optical waveguide, or by scanning the spectrum generated by a spectrograph with the entrance aperture of an optical waveguide thereby creating a scanning monochromer, or a scanning grating monochromer (wavelength selector) in which the grating in a spectrometer is placed on a rotational moveable platform which allows for rotation of the grating in order to superpose a desired wavelength on the entrance aperture of an optical waveguide.

Further detailed below are illustrative methods for processing the acquired hologram data.

In an embodiment, the set of holograms captured by the detector at different spatial locations in the scan at a particular wavelength is used as input to a numerical reconstruction algorithm, which then uses information from the set of holograms to produce a reconstructed ultra-resolved hologram at that wavelength. A numerical reconstruction algorithm is then used to perform aberration correction to reconstruct an ultra-resolved, aberration-corrected hologram using the ultra-resolved hologram as input. A numerical reconstruction algorithm is then used to perform numerical diffraction to reconstruct ultra-resolved amplitude (intensity) and phase information at desired axial depths (Z) using the ultra-resolved, aberration-corrected hologram. A numerical reconstruction algorithm is then used to reconstruct 2D/3D ultra-resolved intensity images and 2D/3D QPCM images using the ultra-resolved amplitude and phase information from one or more axial depths. This sequence of algorithms can be performed for each captured wavelength by the present invention to produce multispectral and hyperspectral 2D/3D ultra-resolved intensity images and 2D/3D QPCM images.

In another embodiment, the set of holograms captured by the detector at different spatial locations in the scan at a particular wavelength is used as input to a numerical reconstruction algorithm, which then uses information from the set of holograms to produce a reconstructed ultra-resolved hologram at that wavelength. A numerical reconstruction algorithm is then used to jointly perform aberration correction and numerical diffraction to reconstruct ultra-resolved amplitude (intensity) and phase information at desired axial depths (z) using the ultra-resolved hologram. A numerical reconstruction algorithm is then used to reconstruct 2D/3D ultra-resolved intensity images and 2D/3D QPCM images using the ultra-resolved amplitude and phase information from one or more axial depths. This sequence of algorithms can be performed for each captured wavelength by the present invention to produce multispectral and hyperspectral 2D/3D ultra-resolved intensity images and 2D/3D QPCM images.

In yet another embodiment, the set of holograms captured by the detector at different spatial locations in the scan at a particular wavelength is used as input to a numerical reconstruction algorithm, which then uses information from the set of holograms to produce ultra-resolved, aberration-corrected amplitude (intensity) and phase information for a particular wavelength at desired axial depths (z). A numerical reconstruction algorithm is then used to reconstruct 2D/3D ultra-resolved intensity images and 2D/3D QPCM images using the ultra-resolved amplitude and phase information from one or more axial depths. This sequence of algorithms can be performed for each captured wavelength by the present invention to produce multispectral and hyperspectral 2D/3D ultra-resolved intensity images and 2D/3D QPCM images.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present system, method and apparatus will be better understood and objects of the invention will become apparent when consideration is given to the following detailed description thereof. Such description makes reference to the annexed drawings, wherein:

FIG. 3 shows a schematic view of possible translational movements of the sensor in accordance with an illustrative embodiment.

Figure 1:
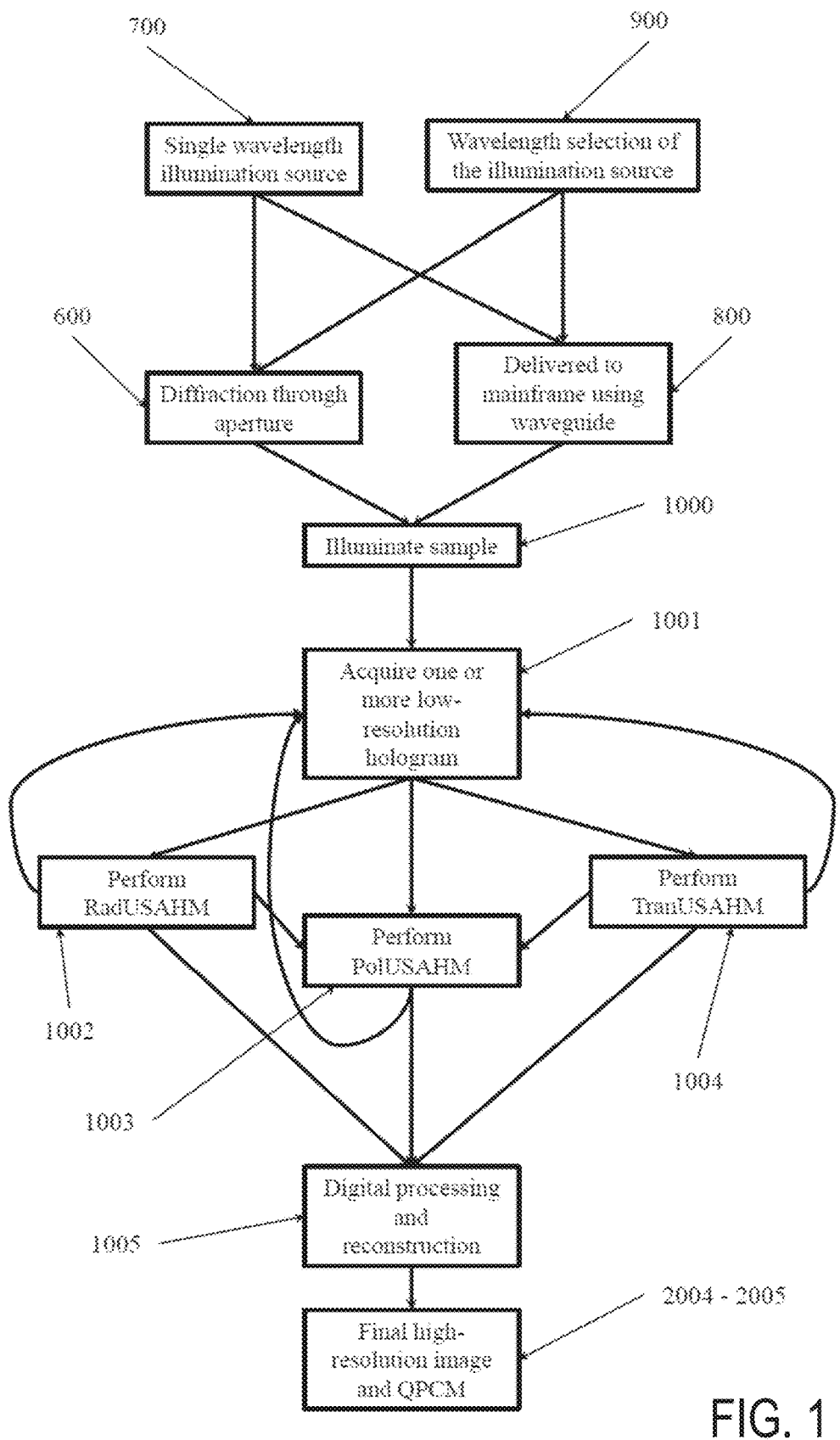
FIG. 1 shows an overview of a method in accordance with an illustrative embodiment.

In the drawings, embodiments of the invention are illustrated by way of example. It is to be expressly understood that the description and drawings are only for the purpose of illustration and as an aid to understanding, and are not intended as describing the accurate performance and behavior of the embodiments and a definition of the limits of the invention.

DETAILED DESCRIPTION

As noted above, the present system, method and apparatus relates generally to the field of micro-scale, and nano-scale muitispectral and hyperspectral holographic microscopic imaging and quantitative phase contrast microscopic imaging.

More generally, the present system and method involves holographic microscopy and quantitative phase contrast microscopy (QPCM) utilizing subpixel scanning of the sensor to perform lensed or lens-free synthetic aperture imaging to achieve ultra-resolution imaging and a large, ultra-wide FOV.

Holography, as first proposed by Dennis Gabor, was a result of efforts to improve the resolution of the electron microscope [1, 2]. By removing the lens used in such systems, the diffraction pattern of the beams can be observed which contain sufficient amplitude and phase information to numerically reproduce the object field.

With the advent of digital sensors such as charge-coupled devices (CCDs) and complementary metal-oxide-semiconductor (CMOS) detectors, analogue holography has given way to digital holography in which interference patterns produced by holographic systems can now be registered and recorded using light detectors. Additionally, with the increase in computing power, processing of the holographic interference patterns are much more efficient and less costly to perform, and the results are much more representative using more advanced processing techniques and algorithms.

Digital holography on a microscopic scale involves digitally acquiring the holographic information of micron-scale or nano-scale objects. The interference pattern arises from the superposition of two beams of light—one beam which travels unimpeded to the detector plane and second beam which arrives at the detector after some interaction with objects being probed. Unlike conventional photography, which only records the intensity as a function of spatial location, holography records both intensity and phase information of the light field, and these parameters can be extracted algorithmically. The combination of intensity and the phase of the light field can provide more complete information about the object being probed, and can therefore be processed and used for various different methods of interpretation.

The performance of a holographic microscope is extremely dependent on many parameters such as: 1) a system's geometry; 2) central wavelength of the illumination source; 3) bandwidth of the illumination source; 4) size of the illumination aperture; 5) detector array size; 6) detector pixel pitch; and 7) detector bit depth.

More particularly, the distance between the sample plane and the detector ($z_0$) and the distance between the light source and the detector ($z_1$) will affect the magnification of the fringes produced, $MF=1+z_0/z1$. This fringe magnification will in turn pose limitations on the FOV of the microscope. In order to maximize the FOV of the device to be equivalent to the size of the active area of the detector array, the sample plane should be placed as close to the sensor plane as possible, resulting in MF~1, and thereby giving rise to "on-chip" measurements. Large fringe magnification will also adversely affect the visibility of the interference patter of smaller objects if they are surrounded by larger objects.

The central wavelength of the illumination source has a direct effect on the resolution of the diffraction or interference pattern and thereby affects the resolution of the reconstructed intensity and phase images. Light of shorter wavelength will produce higher resolution hologram than light of longer wavelength.

Light coherence, temporal or spatial, is a necessary condition for interference and the operating principle of holographic microscopes. The bandwidth of the illumination source correlates directly with the temporal coherence of the light source, Narrowband light sources ($\Delta\lambda<0.5$ nm) such as lasers exhibit extreme temporal coherence such that self-interference becomes possible which gives rise to laser speckle noise. The proliferation of light-emitting diodes (LEDs) provided a solution to the speckle noise problem of laser sources if LEDs were to be used for illumination in conjunction with a small aperture (30-100 µm). The purpose of the aperture is to impose spatial coherence on the LED light which is otherwise incoherent [3, 4]. With the now coherent light of the LED, holograms can be observed. There is an intrinsic tradeoff with the use of an aperture, spatial coherence is increased with smaller aperture size however illumination intensity decreases. High coherence is important for a holographic microscope since it increases the visibility of the interference pattern, $V=(I_{max}-I_{min})/(I_{max}+I_{min})$. The increase in visibility directly correlates to the boost in SNR of the reconstructed intensity and phase map.

Similar to any interferometric device the detector and its properties is the single most important component in a holographic microscope. The pixel pitch and the active area of the pixel array are crucial to the performance of the microscope. The active pixel array area determines the FOV pending the fringe magnification via FOV=array_area/(MF)$^2$. Therefore, having access to the detector sensor in close proximity will maximize the effective FOV by minimizing the fringe magnification. The pixel pitch determines the lateral resolution of a holographic microscope and places a theoretical lateral resolution limit on the device.

More recently, superresolved holographic microscopes based around scanning illumination aperture techniques have been proposed and developed which can achieve sub-micron lateral resolution while maintaining a modest FOV, as mentioned before. The resolutions in these devices approach 250 nm per pixel which is rivaling the lateral resolution performance of a 40× optical microscope.

A superresolution effect based around scanning illumination aperture techniques may achieved in different ways, including: 1) a series of LEDs are arranged side-by-side and are flashed on and off, and 2) a fiber-fed aperture is scanned systematically by translating it in two or three dimensions [5-17]. However, these superresolution techniques result in subpixel shifts in the hologram projected on the detector array and when contiguously amalgamated, simulate a pixel pitch much smaller than the actual detector pixel pitch. Consequently, the aforementioned superresolved holographic microscopy techniques require the accompaniment of powerful and costly reconstruction algorithms to register and back-project the acquired hologram information and solve for the location of the illumination aperture in order to use this information in the hologram reconstruction and processing techniques.

Synthetic aperture sensing was originally introduced in the 1950s as a sensing modality for use in airborne radar measurements and has since seen many advances in order to be used on space borne platforms, such as synthetic aperture radar in which the motion of the aircraft or spacecraft simulates a larger (in size) radar antenna. Since then, the concept of synthetic aperture has found its way into other sensing modalities such as synthetic aperture sonar [18] and synthetic aperture magnetometry [19]. Synthetic aperture techniques have also been used in holographic microscopy to capture a higher range of spatial frequencies of the interferometric diffraction pattern of a given object. This is accomplished by moving the detector to capture a more complete interferometric pattern off of the detector's sensor plane. The detector is commonly displaced by a distance proportional to the full length of the active area to capture complementary adjacent holograms. The series of neighboring holograms are algorithmically stitched together to reproduce a more complete hologram and in turn a higher resolution image can be reconstructed [20]. This method is however limited in lateral resolution by the pitch of the detector pixel.

An alternate method for synthetic aperture hologram capture can be used in order to produce a subpixel resolution. Using a scanning mirror or a collection of symmetric apertures, multiple holograms of the same FOV can be produced on a detector. Registration of these holograms results in artificial subpixel shifts in the holograms which make this approach comparable to the previously mentioned aperture shifting methods. Although high lateral resolution is achieved with the proposed synthetic aperture methods the FOV of these systems is limited since an objective lens is required.

Advantageously, the present system, method and apparatus is able to achieve subpixel imaging resolution ("ultra-resolution") beyond the pitch of the detector pixels while increasing the FOV at the same time by capturing a more complete interferometric pattern through the capturing of multiple holograms at different subpixel displacements of the detector. As such, the present system, method and apparatus is not limited by the imaging resolution and FOV restrictions of the previous synthetic aperture methods.

Measuring the characteristics of the light reflected, scattered, emitted, re-emitted, and absorbed by an object can provide clues about the object's intrinsic properties. For example, these properties can include the physical state or the molecular composition of the object observed, along with many other derived properties. In holographic microscopy, capturing images at different wavelengths, not only affects the resolution of the reconstructed images but the combination of the correct wavelengths can produce 'color' images. These images may contain information that would otherwise not have been observed. Additionally, color images can help with visualization of the different locations of the FOV, pertaining to different species and more fundamentally the difference in the index of refraction. Thus far color imaging in holographic microscopy have been limited to using a color CMOS sensor (a Bayer filter is placed on a group of four pixels [21]) in combination with 1) red, green, and blue laser illumination source [22]: 2) LEDs with central wavelength in the red, green, and blue range [22, 23]; 3) broadband light source, such as a Xenon or Halogen lamp, with a red, green, blue wavelength selector mechanism such as an acousto-optical tunable filer or a liquid crystal tunable filter[24]; 4) various pattern recognition calibration techniques of producing false-colors [25, 26].

To the inventors' knowledge, no previous synthetic aperture color imaging holographic microscopy methods exist. The present system, method and apparatus utilizes synthetic aperture color imaging holographic microscopy methods to provide spectral information beyond the red, green, blue wavelengths achieved by previous methods, by sampling the optical wavelengths more systematically and at smaller wavelength intervals, utilizing wavelengths ranging from the ultraviolet wavelengths and the near Infra-red wavelengths. As such, the present system, method and apparatus achieves multispectral and hyperspectral imaging beyond the red, green, and blue wavelengths of previous methods.

Lasers have historically been used for holographic metrology and are prevalent in other holographic microscope designs however for an 'in-line' or Gabor design of the holographic microscope lasers are not preferred. The high temporal coherence of lasers gives rise to very strong speckle pattern which adversely affects the visibility of the hologram. Additionally, lasers produce undesired multiple reflection effects which further reduce the quality of the hologram.

It will be appreciated that, for simplicity and clarity of illustration, where considered appropriate, reference numerals may be repeated among the figures to indicate corresponding or analogous elements or steps. In addition, numerous illustrative examples are set forth in order to provide a thorough understanding of the invention described herein. However, it will be understood that the embodiments described herein may be practiced without these specific details. In other instances, well-known methods, procedures and components have not been described in detail, so as not to obscure the key aspects of the invention as described herein. Furthermore, this description is not to be considered as limiting the scope of the embodiments described herein in any way, but rather as merely describing the implementation of the various embodiments described herein.

Now referring to FIG. 1, shown is a flowchart illustrating an overview of the proposed instrument and method herein. With As shown in FIG. 1, the light from a single wavelength, monochromatic or quasi-monochromatic, light source 700 or from a wavelength selector mechanism 900 will illuminate a sample either through an aperture 600 located on the mainframe of the instrument or via an optical waveguide 800. The illuminated sample will then diffract the light that it encounters and said light will then interfere with the unaltered light on the plane of the detector 200 and produce a low-resolution hologram which is then digitized and acquired by the detector 1001. Based on the experimental setup and the resolution and FOV requirement a single or a combination of USAHM 1002 1003 1004 will be performed followed by yet another digitization and acquisition of a new hologram 1001. The steps 1001-1004 can be repeated as many times as required. In 1005 the plurality of acquired low-resolution holograms are then combined to produce an ultra-resolution wide FOV hologram and processed to remove any noise and artifacts associated with this modality of imaging that would otherwise degrade the quality of the ultra-resolution wide FOV intensity 2004 and QPCM 2005 images produced.

Figure 2:
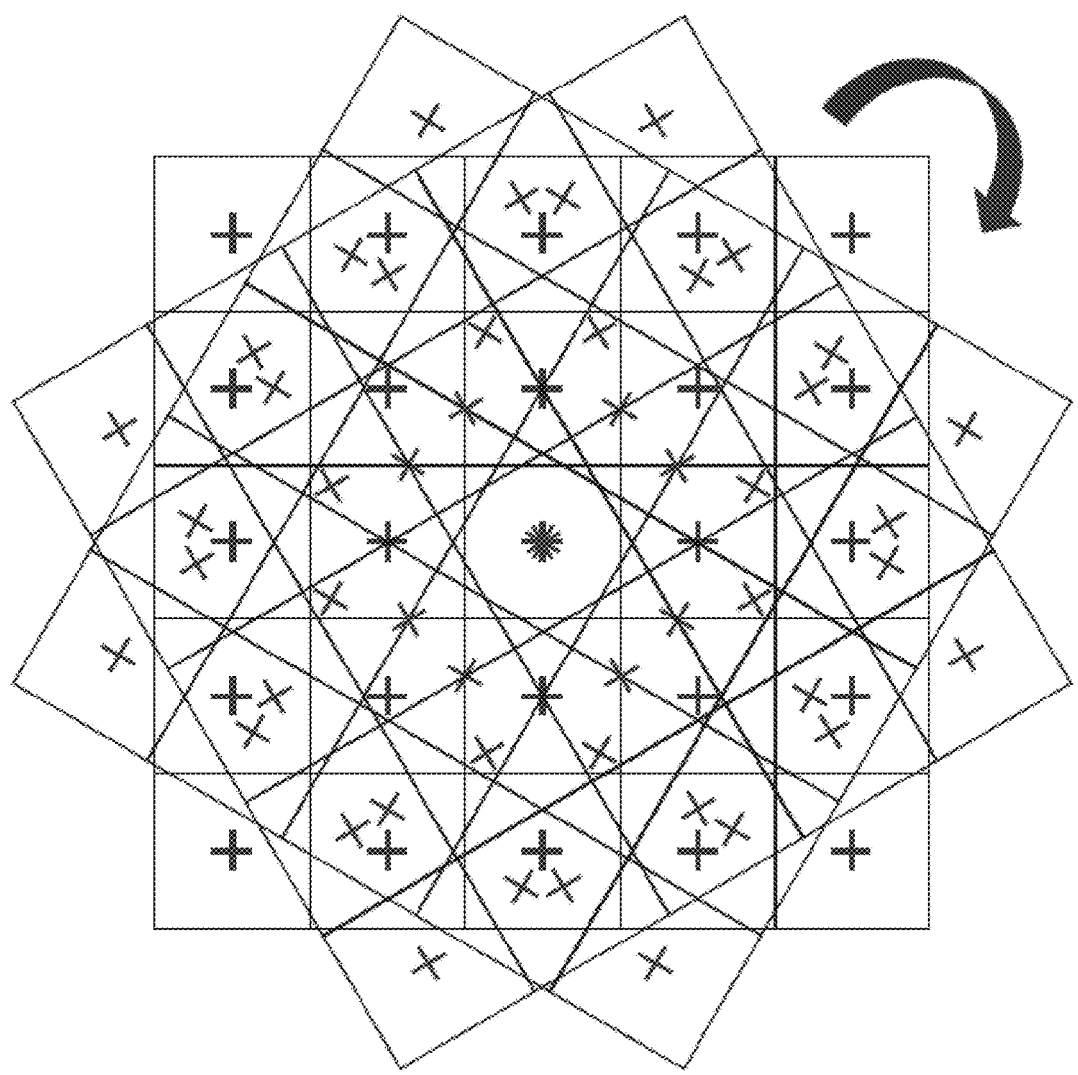
FIG. 2 shows a schematic view of one possible polar/rotational movement of the sensor in accordance with an illustrative embodiment.

With reference to FIG. 2, shown is a schematic of the PolUSAHM configuration of the device, in which the small crosses denote the center of a detector pixel. In this example, the subpixel sampling of the hologram is shown only using three different polar rotations. It can be observed that rotation of a detector can act to subsample each given pixel many times. The rotation can occur either clockwise or counter-clockwise. Smaller rotation angles would result in higher sub-sampling of the hologram therefore leading to an ultra-resolution hologram and by extension intensity and QPCM images. There does however exists an under-sampled region near the center of rotation in this setup. The sampling rate does increase as a function of distance from the center of rotation. This property resembles and inverse modulation transfer function of a lens whereby the spatial resolution limit degrades as a function of radius from the center of the lens. In this case the spatial resolution increases as a function of radius from the center of rotation. This deficiency may be overcome, simply by employing the TranUSAHM (FIG. 3) and/or RadUSAHM (FIG. 4) in combination with PolUSAHM.

Referring now to FIG. 3, shown is a schematic of the TranUSAHM configuration of the device, in which the small crosses denote the center of a detector pixel. The subpixel sampling is demonstrated graphically by showing the five different detector locations of the instrument. It should be noted that the subpixel step size can be as small as allowable by the translation mechanism utilized in the setup, and this can be arbitrarily small. Alternatively, if a translation platform of high resolution is not used in the setup, subpixel shifts can be realized by larger translations. It can be reasoned that by accomplishing subpixel shifts, in the X and Y directions, and hologram acquisition at each of these shifts, an ultra-resolution hologram can be constructed from which an ultra-resolution intensity and QPCM image can be created.

Figure 4:
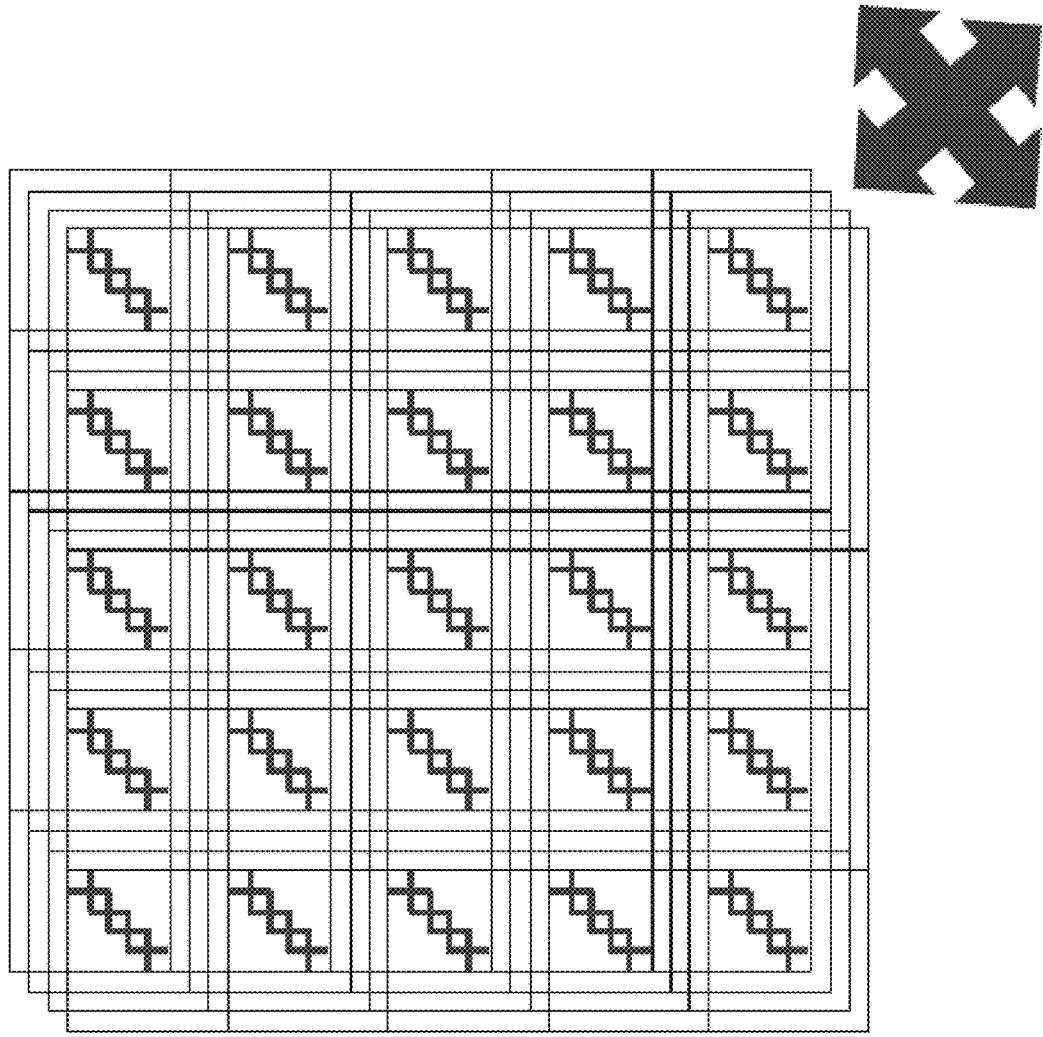
FIG. 4 shows a schematic view of possible radial movements of the sensor in accordance with an illustrative embodiment.

Now referring to FIG. 4, shown is a schematic of the RadUSAHM configuration of the device, in which the small crosses denote the center of a detector pixel. It can be appreciated that the working principles of RadUSAHM is similar to TranUSAHM given the translation in the X and the Y directions are equal. Similarly, ideally the allowable stepwise translation is of subpixel distance and any arbitrarily small step size can be used to capture and ultra-resolution holograms. This configuration can also be realized with only one translational platform situated such that its axis of travel is aligned with the bisector of the first quadrant of the coordinate system of the sample. Reconstruction of the collection of low-resolution holograms will lead to an ultra-resolution hologram which can then be used produce an ultra-resolution intensity and QPCM image.

It will be appreciated that, using a combination of the proposed USAHM schemes, an ultra-wide FOV can be realized which can be many times larger than the active area of the detector used in the system, while at the same time preserving the ultra-resolution advantages of the proposed USAHM. For instance after performing USAHM using one of above mentioned methods a large translation of the detector would allow for observation and digitization of another region of the sample which would otherwise be off of the active sensor area of the detector. Additionally, this translation over a significantly larger area than the detector can be used to capture the continuation of the interferometric diffraction pattern of any of the object which can further improve resolution of the intensity and QPCM image as well as allowing for an ultra-wide FOV.

Figure 5:
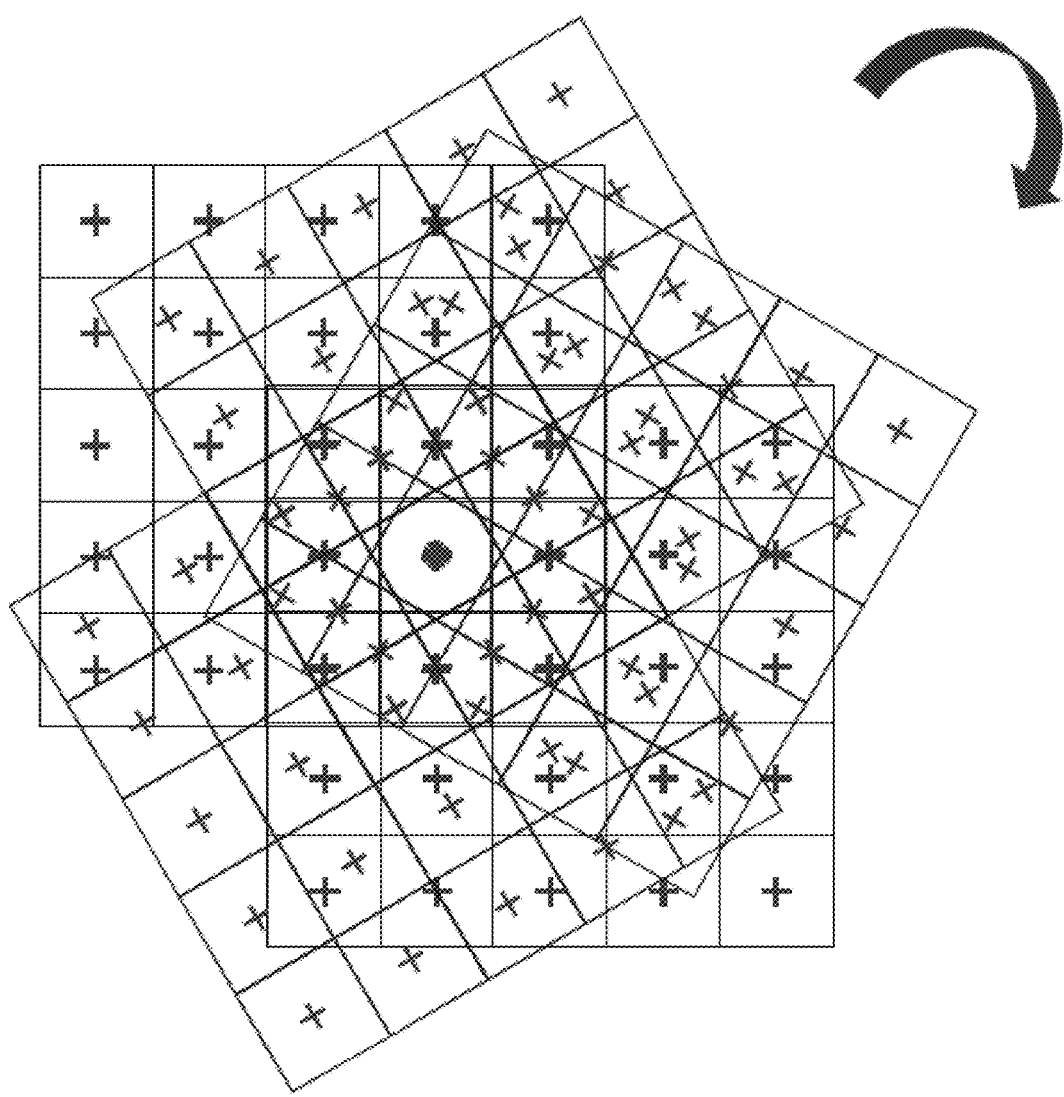
FIG. 5 shows a schematic view of another possible polar/rotational movement of the sensor in accordance with another illustrative embodiment.

An alternate method of performing ultra-resolution hologram capture while simultaneously capturing an ultra-wide FOV is to perform a so called off-axis PolUSAHM. With reference to FIG. 5, shown is a schematic of the off-axis PolUSAHM configuration of the device, in which the small crosses denote the center of a detector pixel. In this configuration, the TranUSAHM and PolUSAHM are utilized concurrently in order to place the axis of rotation of the system toward a corner of the detector in order to perform USAHM. This in turn allows for acquisition of ultra-resolution holograms while simultaneously capture an ultra-wide FOV. After processing of the ultra-resolution holograms, an ultra-resolution ultra-wide FOV intensity and QPCM image can be created.

The three aforementioned synthetic aperture mechanisms (TranUSAHM, PolUSAHM, RadUSAHM) may be used concurrently or individually, nonetheless enabling ultra-resolution holographic microscopy and ultra-resolution QPCM via hologram acquisitions at subpixel shifts of the detector. The three aforementioned synthetic aperture mechanisms may also be used concurrently in a random fashion to achieve random movements of the detector for synthetic aperture scanning.

With reference to FIG. 6, FIG. 7, FIG. 8, FIG. 9, FIG. 10, and FIG. 11 the synthetic aperture enabling mechanism 100-103 is common and are affixed together. The two linear displacement platforms 100 and 101 are used to translate the detector in the lateral X and the Y directions. These two entities enable the TranUSAHM and the RadUSAHM functionality of the proposed system as well as having a major role in enabling the off-axis PolUSAHM functionality.

In these illustrative embodiments, the linear displacement platform 102 is used to translate the detector in the axial Z direction. This entity can be used for various calibration purposes such as removing the twin-image and reducing the interferometric noise as well as other aberrations. The rotational displacement platform is utilized to rotate the detector about the rotational axis of the system therefore enabling PolUSAHM and off-axis PolUSAHM.

These moveable platforms can be controlled manually using analog or digital micrometers, or electronically by employing linear actuators pistons, picomotors, piezoelectric servos, etc. Alternatively, the locomotion mechanism can be embedded into the platform. As previously mentioned, with the extremely accurate and precise displacement mechanism, small displacement steps on the order of tens of nanometers can be achieved, enabling ultra-resolution hologram acquisition, and any number of subpixel displacements can be used. If the displacement mechanism does not have very high precision and accuracy, ultra-resolution hologram acquisition is nevertheless still possible since these systems will not have a very high rate of repeatability in displacement steps. Therefore, by stepping forward then backward, subpixel displacement can be achieved. To enable the ultra-wide FOV capability, the moveable platforms 100 and 101 would have to have a displacement range that is larger than the size of the active area of the detector 200.

Again, with reference to FIG. 6, FIG. 7, FIG. 8, FIG. 9, FIG. 10, and FIG. 11, the digital hologram acquisition device 200, i.e. the detector, is common to each embodiment. In these examples, the detector is affixed to the rotational displacement platform, and is displaced using synthetic aperture mechanisms 100-103 to capture ultra-resolution ultra-wide FOV holograms. Moreover, the representation of the sample 501 and the sample container 500 is shared among the mentioned figures. The sample container 500 may be constructed from transparent material such as any form of glass or quartz. Commonly, a microscope slide or a microscope cover slip can be utilized to contain the sample.

Figure 6:
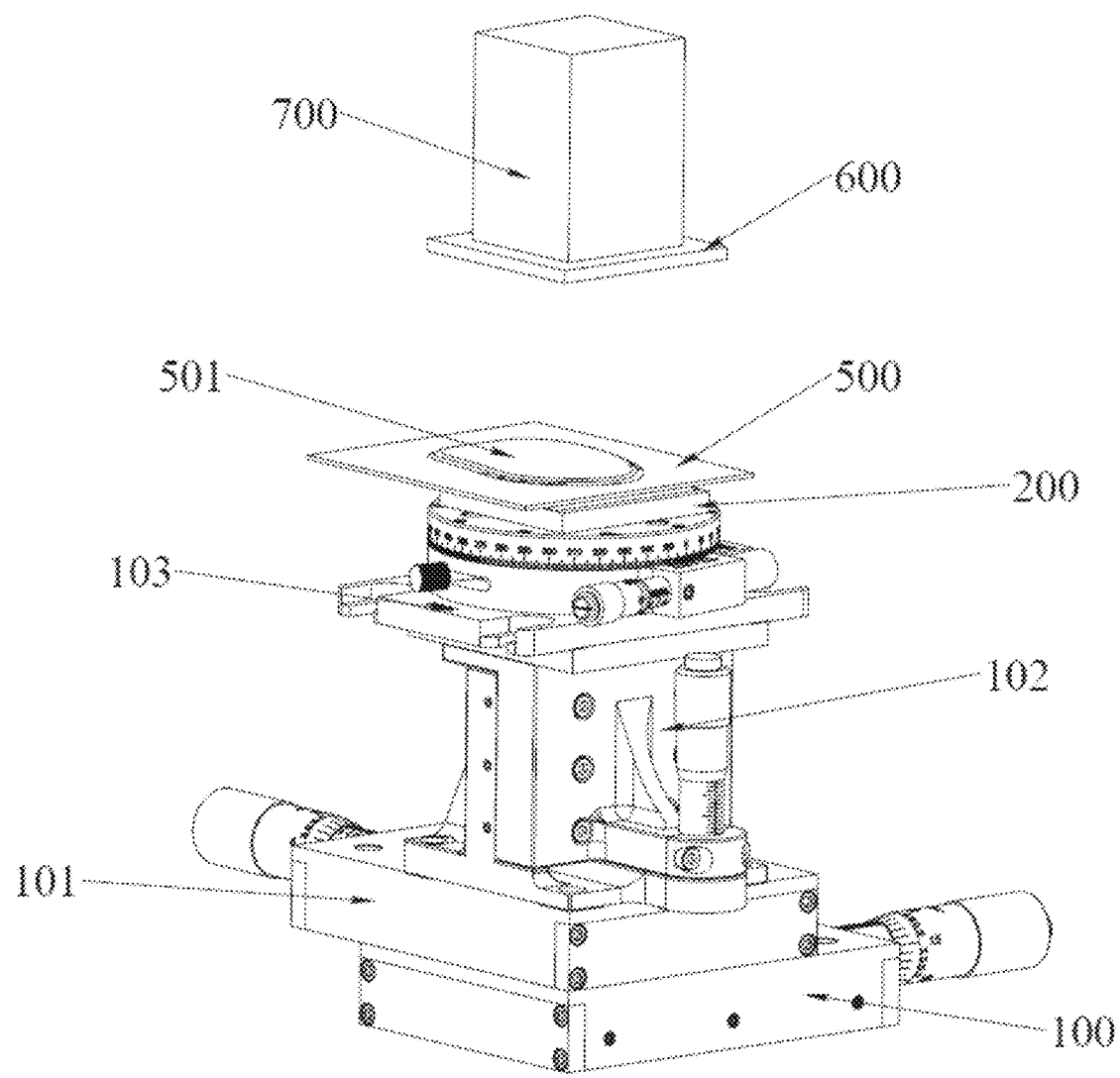
FIG. 6 shows a schematic view of a light source main frame apparatus in accordance with an illustrative embodiment.
Figure 7:
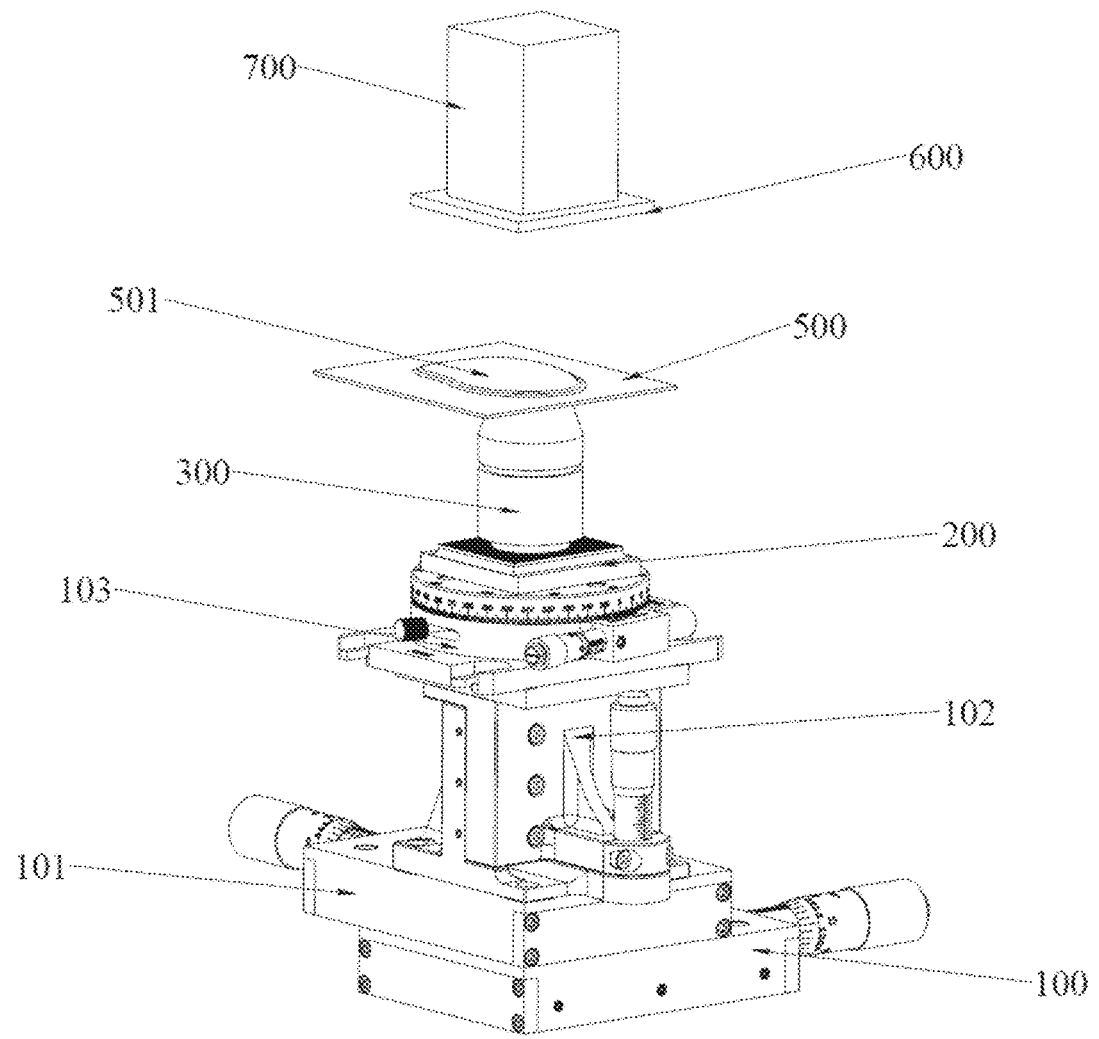
FIG. 7 shows a schematic view of the light source main frame apparatus of FIG. 6 with a lens in accordance with an embodiment.
Figure 8:
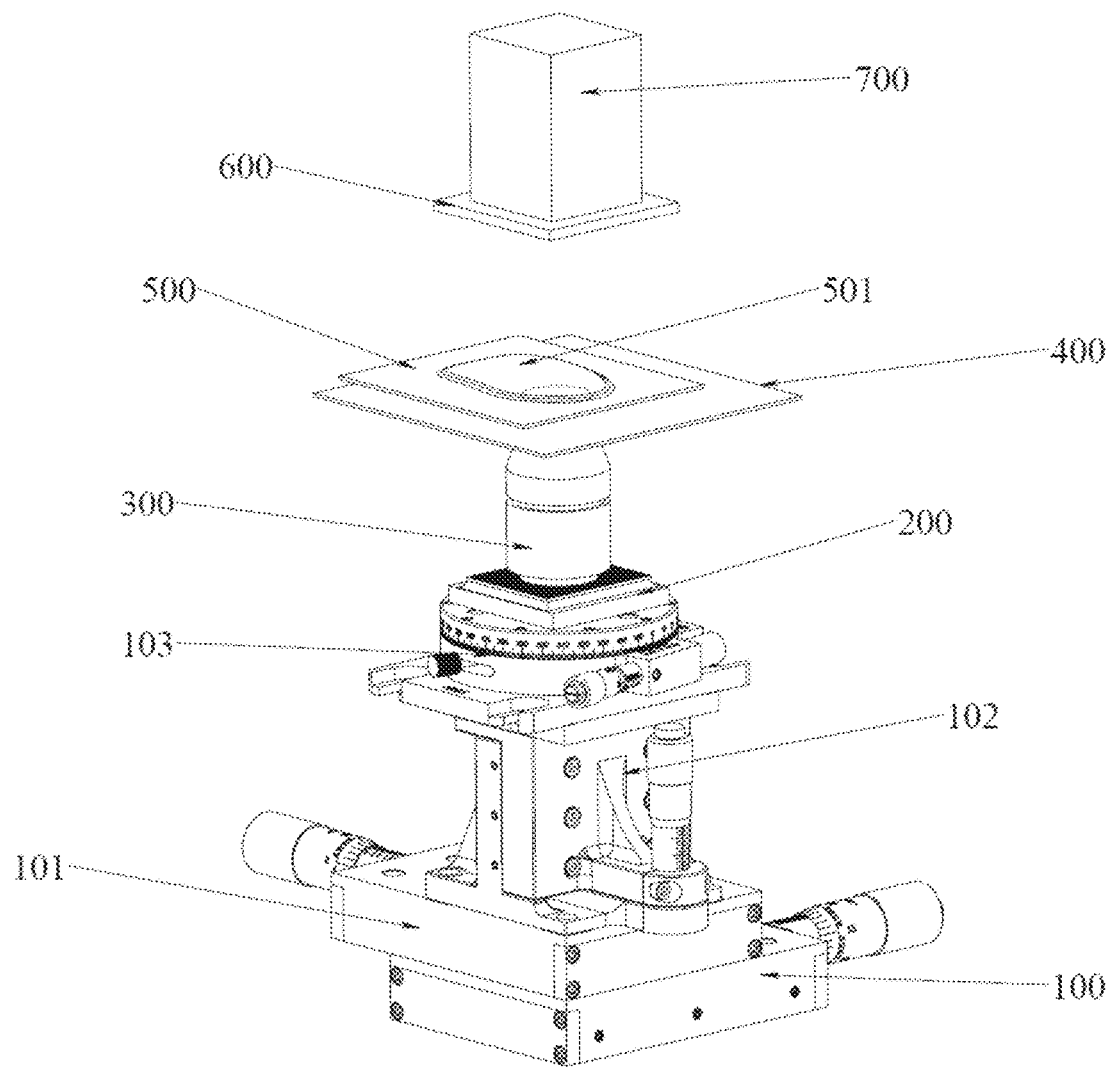
FIG. 8 shows a schematic view of the light source main frame apparatus of FIG. 6 with a lens and cinematic screen in accordance with an embodiment.

With reference to FIG. 6, FIG. 7, and FIG. 8 the light source 700 can be any of the following, which will be used to illuminate the aperture 600:

- A single or a series of LEDs with or without narrow bandpass spectral filters and can be turned on sequentially or simultaneously;
- A single or a series of laser sources that can be turned on sequentially or simultaneously;
- A single or a series of scanning grating monochromoters placed on a rotationally moveable platform;
- A nano-photonic ring-resonator spectrograph wavelength selector.

Figure 9:
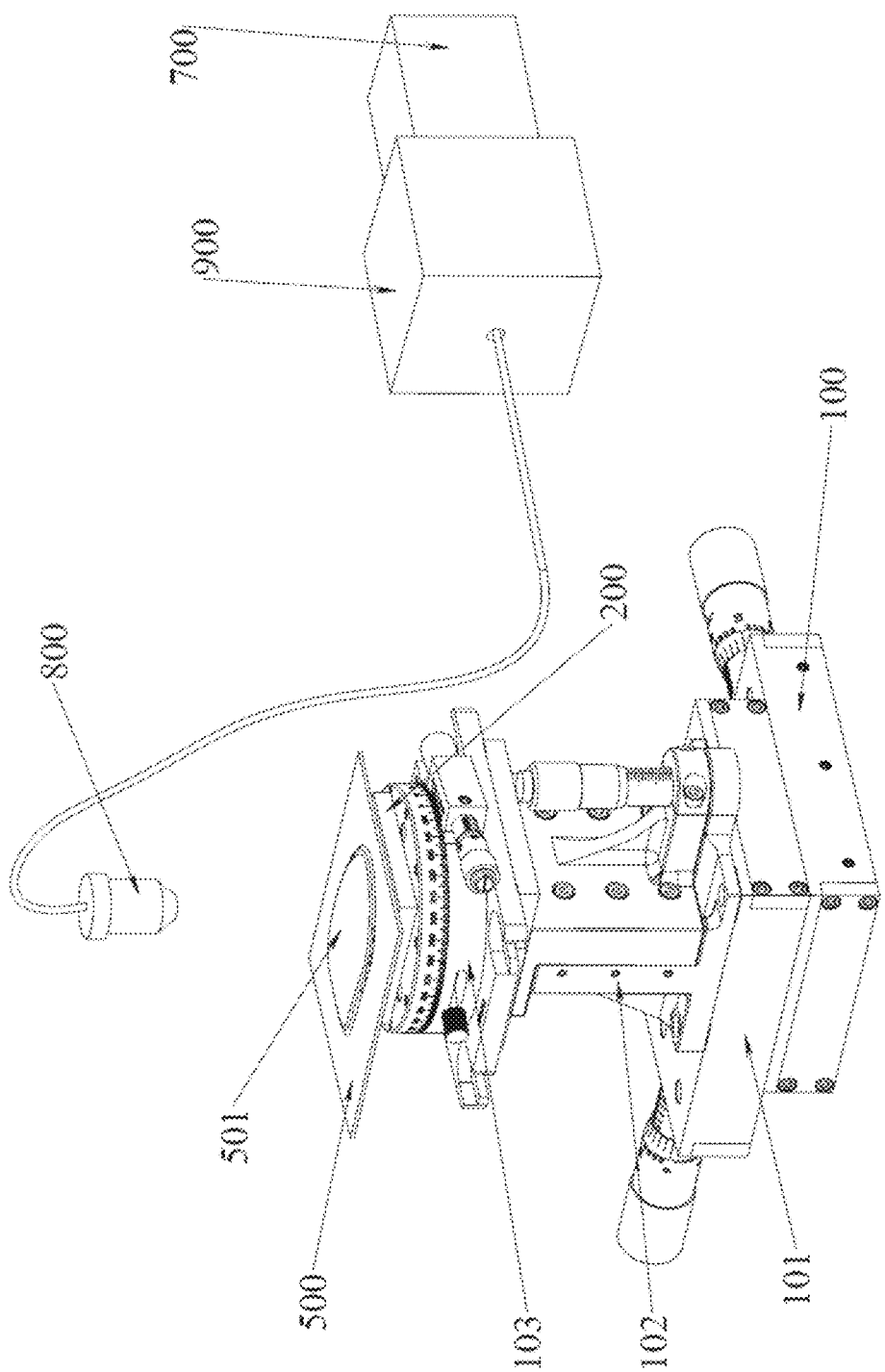
FIG. 9 shows a schematic view of a light source main frame apparatus with a light source provided off the main frame in accordance with an embodiment.
Figure 10:
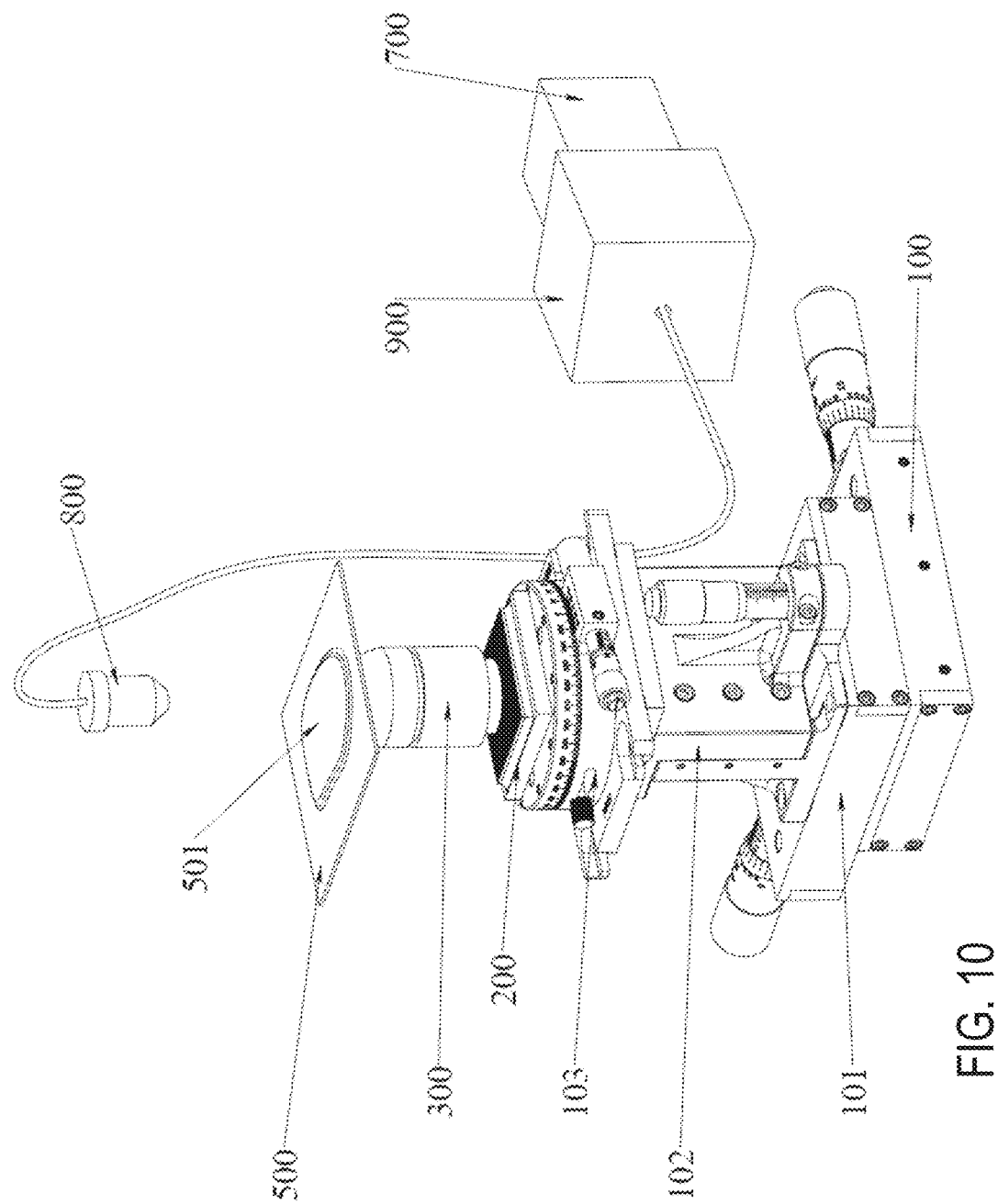
FIG. 10 shows a schematic view of the light source main frame apparatus of FIG. 9 with a lens in accordance with an embodiment.
Figure 11:
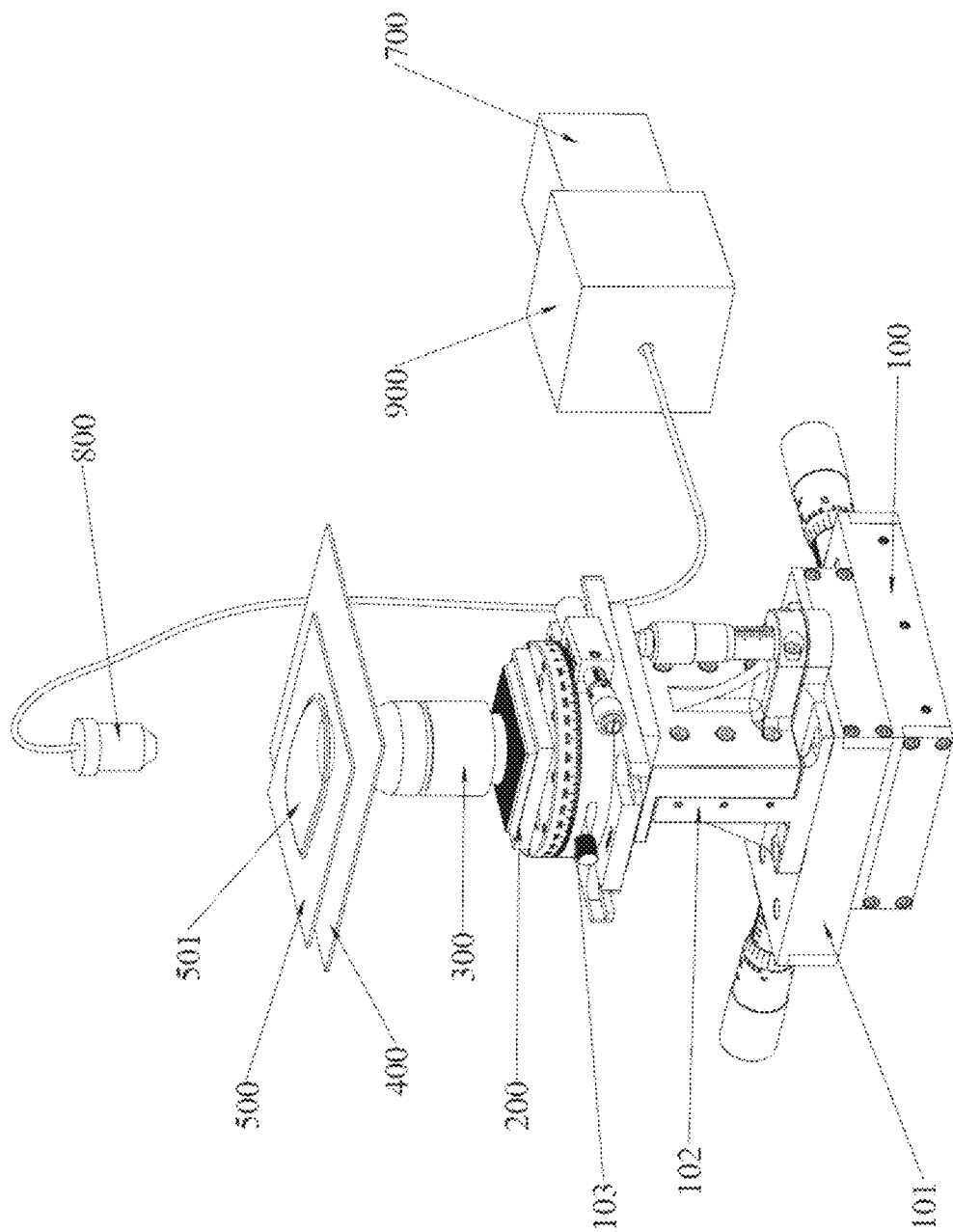
FIG. 11 shows a schematic view of the light source main frame apparatus of FIG. 9 with a lens and cinematic screen in accordance with an embodiment.

With reference to FIG. 9, FIG. 10, and FIG. 11 the light source 700 can be any of the following which will be used to illuminate the entrance aperture of an optical waveguide 800 that may or may not pass through a spectral selection mechanism 900:

- A broadband light source such as a Halogen or Halogen-Tungsten or a Xenon lamp which will then require the use of the spectral selection mechanism 900 which can be any of the following:
    - A single or a series of narrow bandpass spectral filters;
    - An acousto-optical tunable filter;
    - A liquid crystal tunable filter;
    - A spectrometer, which would produce a high-resolution spectrum of the light source which will require the entrance aperture of the waveguide to be placed on a moveable platform to sample the spectrum produced, alternatively the grating of the spectrometer can be placed on a rotational moveable platform.

A single or a series of LEDs with or without narrow bandpass spectral filters and can be turned on sequentially or simultaneously, in this case the spectral selection mechanism 900 is not required;

A single or a series of laser sources that can be turned on sequentially or simultaneously, in this case the spectral selection mechanism 900 is not required;

A tunable laser source which would allow for a range of laser wavelengths, in this case the spectral selection mechanism 900 is not required;

Referring to FIG. 8 and FIG. 11 a projection screen 400 is used in these embodiments. This screen is translucent and will act as an analog method of observing the hologram of the sample. The projected hologram can then be probed and digitized on the detector by using a microscope objective lens. This method will further aid with the capture of the ultra-resolution hologram as well as ultra-wide FOV as the observation of the projected hologram can be done at any desired magnification.

With respect to the embodiments where a microscope objective lens is utilized, FIG. 7, FIG. 8, FIG. 10, and FIG. 11. If a laser source or a nano-photonics monochrometer is to be used for illumination, the aperture 600 will be removed in the embodiments presented in FIG. 7 and FIG. 8, and the illumination source 700 will include collimation optics to collimate the laser beam. In embodiments presented in FIG. 10 and FIG. 11, the collimation topics will be placed after the exit aperture of the optical waveguide 800.

Referring back to FIG. 6, the light generated by the illumination source 700 encounters the aperture 600 and is then diffracted out of the aperture. By passing through the aperture, the diffracted light now possess spatial coherence which is a condition for interference to occur. The diffracted light will then propagate in a hemisphere ($2\pi$ steradian) toward the sample 501 and will illuminate it. Some of the light will continue through the sample container 500 toward the detector 200 and some of the light will interact with various structures in the sample. The light that encounters structure in the sample will diffract as a result of this interaction and will then continue through the sample container 500 toward the detector 200. On the surface of the detector the two parts of the original beam of light will be superimposed and will therefore interfere constructively and destructively. These interference patterns are referred to as holograms. The hologram is then digitized and recorded by the detector 200. The detector has a limited number of pixels and an active sensing area, hence utilizing the synthetic aperture mechanism enabled by the combination of moveable platforms 100-103, many other holograms of the sample can be recorded. In this illustrative example, the detector 200 is affixed to the moveable platforms 100-103. The output of this embodiment is a set of low-resolution holograms which will then be processed to produce ultra-resolution ultra-wide FOV intensity and QPCM image of the sample.

In the illustrative embodiment depicted in FIG. 7, the light generated by the illumination source 700 encounters the aperture 600 and is then diffracted out of the aperture. By passing through the aperture, the diffracted light now possess spatial coherence which is a condition for interference to occur. The diffracted light will then propagate in a hemisphere ($2\pi$ steradian) toward the sample 501 and will illuminate it. Some of the light will continue through the sample container 500 toward the microscope objective lens 300 and some of the light will interact with various structures in the sample. The light that encounters structure in the sample will diffract as a result of this interaction and will then continue through the sample container 500 toward the microscope objective lens. The lens in this case will allow for observation of a higher resolution hologram while relaying the two superimposed beams of light onto the detector 200. The detector has a limited number of pixels and an active sensing area, hence utilizing the synthetic aperture mechanism enabled by the combination of moveable platforms 100-103, many other holograms of the sample can be recorded. In this illustrative example, the microscope objective lens 300 is affixed to the detector 200 which is then affixed to the moveable platforms 100-103. The output of this embodiment is a set of holograms which will then be processed to produce an ultra-resolution ultra-wide FOV intensity and QPCM image of the sample.

With respect to FIG. 8, the light generated by the illumination source 700 encounters the aperture 600 and is then diffracted out of the aperture. By passing through the aperture, the diffracted light now possess spatial coherence which is a condition for interference to occur. The diffracted light will then propagate in a hemisphere ($2\pi$ steradian) toward the sample 501 and will illuminate it. Some of the light will continue through the sample container 500 toward the cinematic screen 400 and some of the light will interact with various structures in the sample. The light that encounters structure in the sample will diffract as a result of this interaction and will then continue through the sample container 500 toward the cinematic screen 400. The hologram which is produced as a result of the superposition of the two beams will be formed, or 'projected' on the screen in an analog fashion. This hologram is therefore continuous and can be sampled and digitized at any desired magnification aiding the ultra-resolution hologram acquisition process. The moveable platforms 100-103 will then displace the detector 200 and the microscope objective lens 300 to observe and record a series of holograms while increasing the FOV of the observation. The output of this embodiment is a set of holograms which will then be processed to produce ultra-resolution ultra-wide FOV intensity and QPCM image of the sample.

With reference to FIG. 9, the light generated by the illumination source 700, may be guided through the wavelength selecting mechanism 900, and illuminates the entrance aperture of an optical waveguide 800. The optical waveguide can then traverse virtually any distance and guide the light to the instrument. The light will diffract out of the exit aperture of the optical waveguide and will thereby possess spatial coherence which is a condition for interference to occur. The diffracted light will then propagate in a hemisphere ($2\pi$ steradian) toward the sample 501 and will illuminate it. Some of the light will continue through the sample container 500 toward the detector 200 and some of the light will interact with various structures in the sample. The light that encounters structure in the sample will diffract as a result of this interaction and will then continue through the sample container 500 toward the detector 200. On the surface of the detector the two parts of the original beam of light will be superimposed and will therefore interfere constructively and destructively. These interference patterns are referred to as holograms. The hologram is then digitized and recorded by the detector 200. The detector has a limited number of pixels and an active sensing area, hence utilizing the synthetic aperture mechanism enabled by the combination of moveable platforms 100-103, many other holograms of the sample can be recorded. In this illustrative example, the detector 200 is affixed to the moveable platforms 100-103. The output of this embodiment is a set of low-resolution holograms which will then be processed to produce ultra-resolution ultra-wide FOV intensity and QPCM image of the sample.

Referring to FIG. 10, the light generated by the illumination source 700, may be guided through the wavelength selecting mechanism 900, and illuminates the entrance aperture of an optical waveguide 800. The optical waveguide can then traverse any distance and guide the light to the instrument. The light will diffract out of the exit aperture of the optical waveguide and will thereby possess spatial coherence which is a condition for interference to occur. The diffracted light will then propagate in a hemisphere ($2\pi$ steradian) toward the sample 501 and will illuminate it. Some of the light will continue through the sample container 500 toward the microscope objective lens 300 and some of the light will interact with various structures in the sample. The light that encounters structure in the sample will diffract as a result of this interaction and will then continue through the sample container 500 toward the microscope objective lens. The lens in this case will allow for observation of a higher resolution hologram while relaying the two superimposed beams of light onto the detector 200. The detector has a limited number of pixels and an active sensing area, hence utilizing the synthetic aperture mechanism enabled by the combination of moveable platforms 100-103, many other holograms of the sample can be recorded. In this illustrative example, the microscope objective lens 300 is affixed to the detector 200 which is then affixed to the moveable platforms 100-103. The output of this embodiment is a set of holograms which will then be processed to produce ultra-resolution ultra-wide FOV intensity and QPCM image of the sample.

In the illustrative embodiment depicted in FIG. 11, the light generated by the illumination source 700, may be guided through the wavelength selecting mechanism 900, and illuminates the entrance aperture of an optical waveguide 800. The optical waveguide can then traverse virtually any distance and guide the light to the instrument. The light will diffract out of the exit aperture of the optical waveguide and will thereby possess spatial coherence which is a condition for interference to occur. The diffracted light will then propagate in a hemisphere ($2\pi$ steradian) toward the sample 501 and will illuminate it. Some of the light will continue through the sample container 500 toward the cinematic screen 400 and some of the light will interact with various structures in the sample. The light that encounters structure in the sample will diffract as a result of this interaction and will then continue through the sample container 500 toward the cinematic screen 400. The hologram which is produced as a result of the superposition of the two beams will be formed, or 'projected' on the screen in an analog fashion. The moveable platforms 100-103 will then displace the detector 200 and the microscope objective lens 300 to observe and record a series of holograms while increasing the FOV of the observation. The output of this embodiment is a set of holograms which will then be processed to produce ultra-resolution ultra-wide FOV intensity and QPCM image of the sample.

Figure 12:
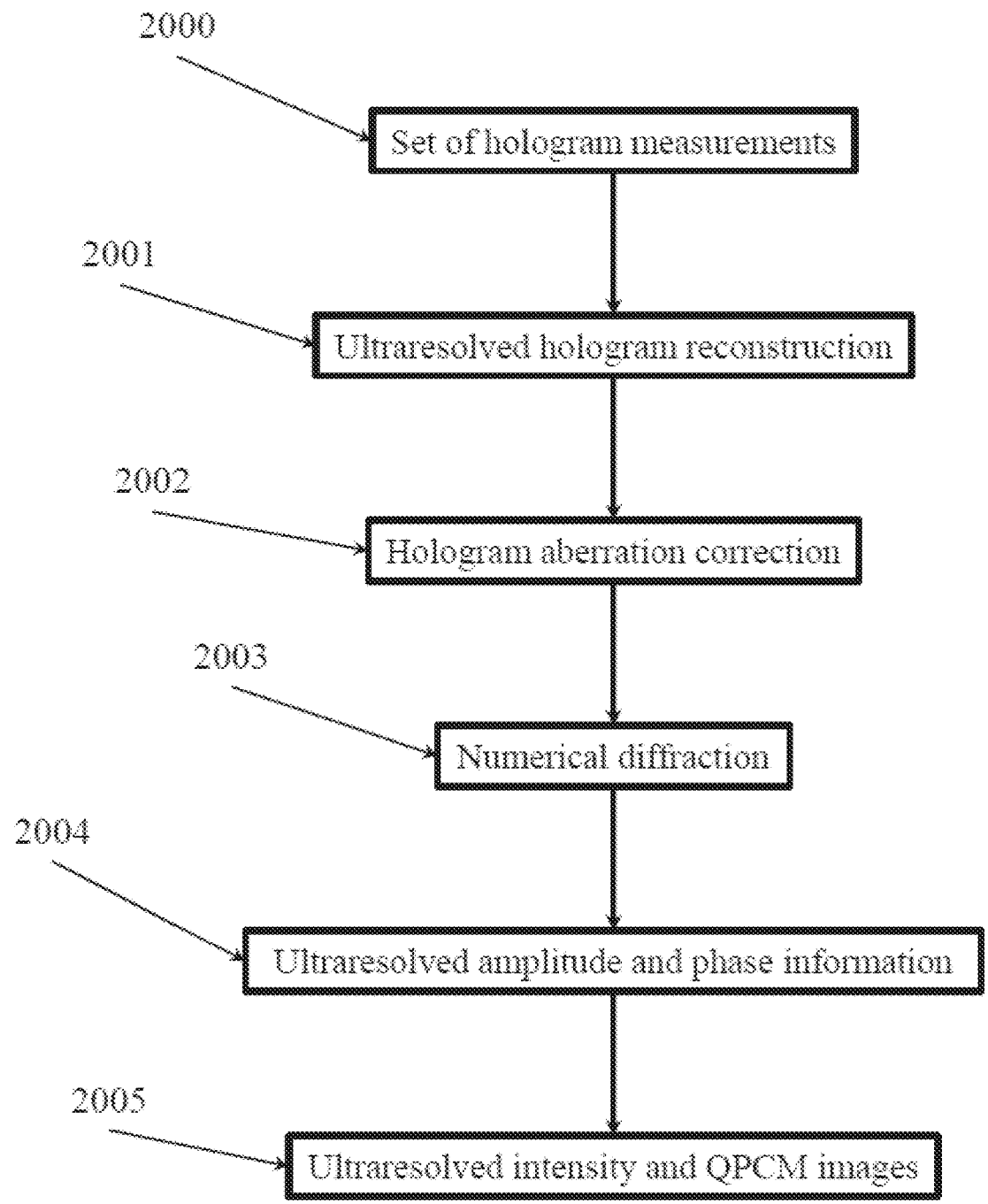
FIG. 12 shows a schematic flow chart of a method for processing a set of hologram measurements to obtain an image in accordance with an embodiment.

With reference to FIG. 12, shown is one illustrative embodiment of the possible algorithmic processing pipelines that can be used for producing ultra-resolved ultra-wide FOV intensity and QPCM images using the USAHM generated data. The set of n holograms captured by the detector at different spatial locations in the scan at a particular wavelength (denoted by $h_1, h_2, \ldots, h_n$) 2000 is used as input to a numerical reconstruction algorithm 2001, which then uses information from the set of holograms to produce a reconstructed ultra-resolved hologram (denoted by f) at that wavelength:

$$f = \mathrm{interp}(h_1, h_2, \ldots, h_n)$$

where interp(.) is an interpolation function that interpolates pixels in f using pixels in $h_1, h_2, \ldots, h_n$. Possible interpolation functions include nearest-neighbor, bilinear, and bicubic interpolation, but are not limited to these functions and other interpolation functions can be used in other embodiments. A numerical reconstruction algorithm 2002 is then used to perform aberration correction to reconstruct an ultra-resolved, aberration-corrected hologram (f') using the ultra-resolved hologram (f) as input:

$$f' = A(f, L)$$

where A is an aberration correction function and L is the point spread function. A possible aberration correction function is the following Maximum A Posteriori optimization function:

$$f' = \arg\max_{f'} P(f|f', L)$$

where $P(f|f', L)$ is the posterior probability of f given f' and L. Note that aberration correction is not limited to this function, and other aberration correction functions can be used in other embodiments. A numerical reconstruction algorithm 2003 is then used to perform numerical diffraction to reconstruct ultra-resolved amplitude (intensity) and phase information 2004 at desired axial depths (z) (denoted by $g = \{g_{amplitude}, g_{phase}\}$) using the ultra-resolved, aberration-corrected hologram:

$$g = D(f', z)$$

where D is a numerical diffraction function encompassing a numerical diffraction method and z is the desired depth. Possible numerical diffraction methods in the numerical diffraction function that can be used include Fresnel Transform, Huygens convolution, Angular Spectrum method, as well as Bayesian-based numerical diffraction as expressed by the following equation:

$$g = \arg\max_g P(g|f, z)$$

where $P(g|f, z)$ is the posterior probability of g given hologram f and depth z. Note that numerical diffraction is not limited to these methods, and other numerical diffraction methods can be used in other embodiments. A numerical reconstruction algorithm is then used to reconstruct 2D/3D ultra-resolved intensity images ($g'_{amplitude}$) and 2D/3D QPCM images ($g'_{QPCM}$) 2005 using the ultra-resolved amplitude and phase information from one or more axial depths $z_1, z_2, \ldots, z_n$ 2004 (m denotes the number of depths):

$$g'_{amplitude} = U(g_{amplitude}(z_1), g_{amplitude}(z_2), \ldots, g_{amplitude}(z_m))$$

$$g'_{QPCM} = V(g_{phase}(z_1), g_{phase}(z_2), \ldots, g_{phase}(z_m))$$

where $g_{amplitude}(z)$ denotes ultra-resolved amplitude information from depth z, $g_{amplitude}(z)$ denotes ultra-resolved phase information from depth z, U is a function for reconstructing 2D/3D ultra-resolved intensity images ($g'_{amplitude}$) from $g_{amplitude}(z_1), g_{amplitude}(z_2), \ldots, g_{amplitude}(z_m)$, and U is a function for reconstructing 2D/3D QPCM images ($g'_{QPCM}$) from $g_{phase}(z_1), g_{phase}(z_2), \ldots, g_{phase}(z_m)$. One possible function for U is to interpolate a 3D ultra-resolved intensity image $g'_{amplitude}$ using pixels from $g_{amplitude}(z_1), g_{amplitude}(z_2), \ldots, g_{amplitude}(z_m)$:

$$g'_{amplitude} = \mathrm{interp}(g_{amplitude}(z_1), g_{amplitude}(z_2), \ldots, g_{amplitude}(z_m))$$

where interp(.) is an interpolation function that interpolates pixels in $g'_{amplitude}$ using pixels in $g_{amplitude}(z_1)$, $g_{amplitude}(z_2)$, ..., $g_{amplitude}(z_m)$. One possible function for V is to interpolate a 3D ultra-resolved QPCM image $g'_{QPCM}$ using pixels from $g_{phase}(z_1)$, $g_{phase}(z_2)$, ..., $g_{phase}(z_m)$:

$$g'_{QPCM} = \text{interp}(g_{phase}(z_1), g_{phase}(z_2), \ldots, g_{phase}(z_m))$$

where interp(.) is an interpolation function that interpolates pixels in $g'_{QPCM}$ using pixels in $g_{phase}(z_1)$, $g_{phase}(z_2)$, ..., $g_{phase}(z_m)$. Note that reconstruction is not limited to these methods, and other reconstruction methods can be used in other embodiments. This sequence of algorithms can be performed for each captured wavelength by the present invention to produce multispectral and hyperspectral 2D/3D ultra-resolved intensity images and 2D/3D QPCM images.

Figure 13:
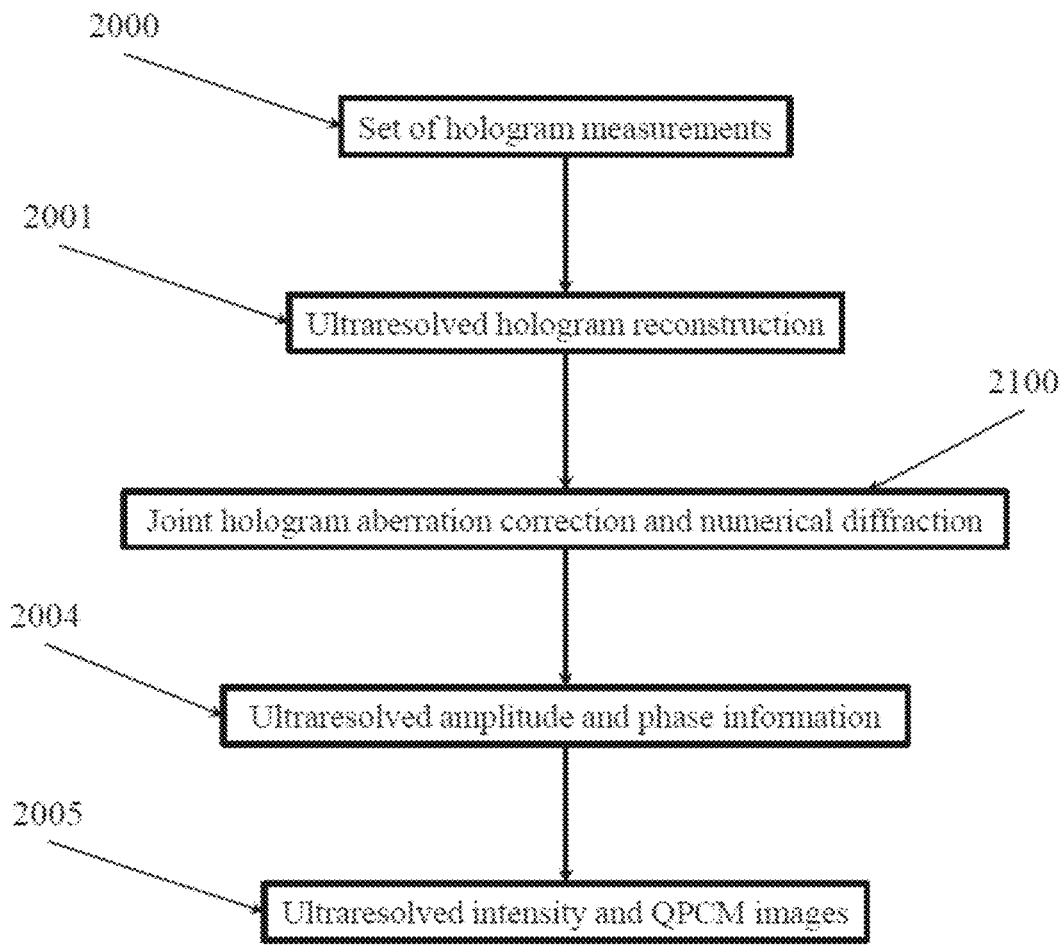
FIG. 13 shows a schematic flow chart of another method for processing a set of hologram measurements to obtain an image in accordance with another embodiment.

With reference to FIG. 13, shown is another illustrative example of a possible algorithmic processing pipelines that can be used for producing ultra-resolved ultra-wide FOV intensity and QPCM images using the USAHM generated data. The set of n holograms captured by the detector at different spatial locations in the scan at a particular wavelength (denoted by $h_1, h_2, \ldots, h_n$) 2000 is used as input to a numerical reconstruction algorithm 2001, which then uses information from the set of holograms to produce a reconstructed ultra-resolved hologram (denoted by f') at that wavelength:

$$f' = \text{interp}(h_1, h_2, \ldots, h_n)$$

where interp(.) is an interpolation function that interpolates pixels in f' using pixels in $h_1, h_2, \ldots, h_n$. Possible interpolation functions include nearest-neighbor, bilinear, and bicubic interpolation, but are not limited to these functions and other interpolation functions can be used in other embodiments. A numerical reconstruction algorithm 2100 is then used to perform joint aberration correction and numerical diffraction to reconstruct ultra-resolved amplitude (intensity) and phase information 2004 at desired axial depths (z) (denoted by $g = \{g_{amplitude}, g_{phase}\}$) using the ultra-resolved hologram (f') as input:

$$g = AN(f', L, z)$$

where AN is a joint aberration correction and numerical diffraction function, L is the point spread function, and z is the desired depth. A possible joint aberration correction and numerical diffraction function is the following Maximum A Posteriori optimization function:

$$g = \arg\max_g P(g|f', L, z)$$

where $P(g|f', L)$ is the posterior probability of g given f', L, and z. Note that joint aberration correction and numerical diffraction is not limited to this function, and other joint aberration correction and numerical diffraction functions can be used in other embodiments. A numerical reconstruction algorithm is then used to reconstruct 2D/3D ultra-resolved intensity images ($g'_{amplitude}$) and 2D/3D QPCM images ($g'_{QPCM}$) 2005 using the ultra-resolved amplitude and phase information from one or more axial depths $z_1, z_2, \ldots, z_m$ 2004 (m denotes the number of depths):

$$g'_{amplitude} = U(g_{amplitude}(z_1), g_{amplitude}(z_2), \ldots, g_{amplitude}(z_m))$$

$$g'_{QPCM} = V(g_{phase}(z_1), g_{phase}(z_2), \ldots, g_{phase}(z_m))$$

where $g_{amplitude}(z)$ denotes ultra-resolved amplitude information from depth z, $g_{amplitude}(z)$ denotes ultra-resolved phase information from depth z, U is a function for reconstructing 2D/3D ultra-resolved intensity images ($g'_{amplitude}$) from $g_{amplitude}(z_1), g_{amplitude}(z_2), \ldots, g_{amplitude}(z_m)$, and U is a function for reconstructing 2D/3D QPCM images ($g'_{QPCM}$) from $g_{phase}(z_1), g_{phase}(z_2), \ldots, g_{phase}(z_m)$. One possible function for U is to interpolate a 3D ultra-resolved intensity image $g'_{amplitude}$ using pixels from $g_{amplitude}(z_1)$, $g_{amplitude}(z_2), \ldots, g_{amplitude}(z_m)$:

$$g'_{amplitude} = \text{interp}(g_{amplitude}(z_1), g_{amplitude}(z_2), \ldots, g_{amplitude}(z_m))$$

where interp(.) is an interpolation function that interpolates pixels in $g'_{amplitude}$ using pixels in $g_{amplitude}(z_1)$, $g_{amplitude}(z_2)$, ..., $g_{amplitude}(z_m)$. One possible function for V is to interpolate a 3D ultra-resolved QPCM image $g'_{QPCM}$ using pixels from $g_{phase}(z_1)$, $g_{phase}(z_2)$, ..., $g_{phase}(z_m)$:

$$g'_{QPCM} = \text{interp}(g_{phase}(z_1), g_{phase}(z_2), \ldots, g_{phase}(z_m))$$

where interp(.) is an interpolation function that interpolates pixels in $g'_{QPCM}$ using pixels in $g_{phase}(z_1)$, $g_{phase}(z_2)$, ..., $g_{phase}(z_m)$. Note that reconstruction is not limited to these methods, and other reconstruction methods can be used in other embodiments. This sequence of algorithms can be performed for each captured wavelength by the present invention to produce multispectral and hyperspectral 2D/3D ultra-resolved intensity images and 2D/3D QPCM images.

Figure 14:
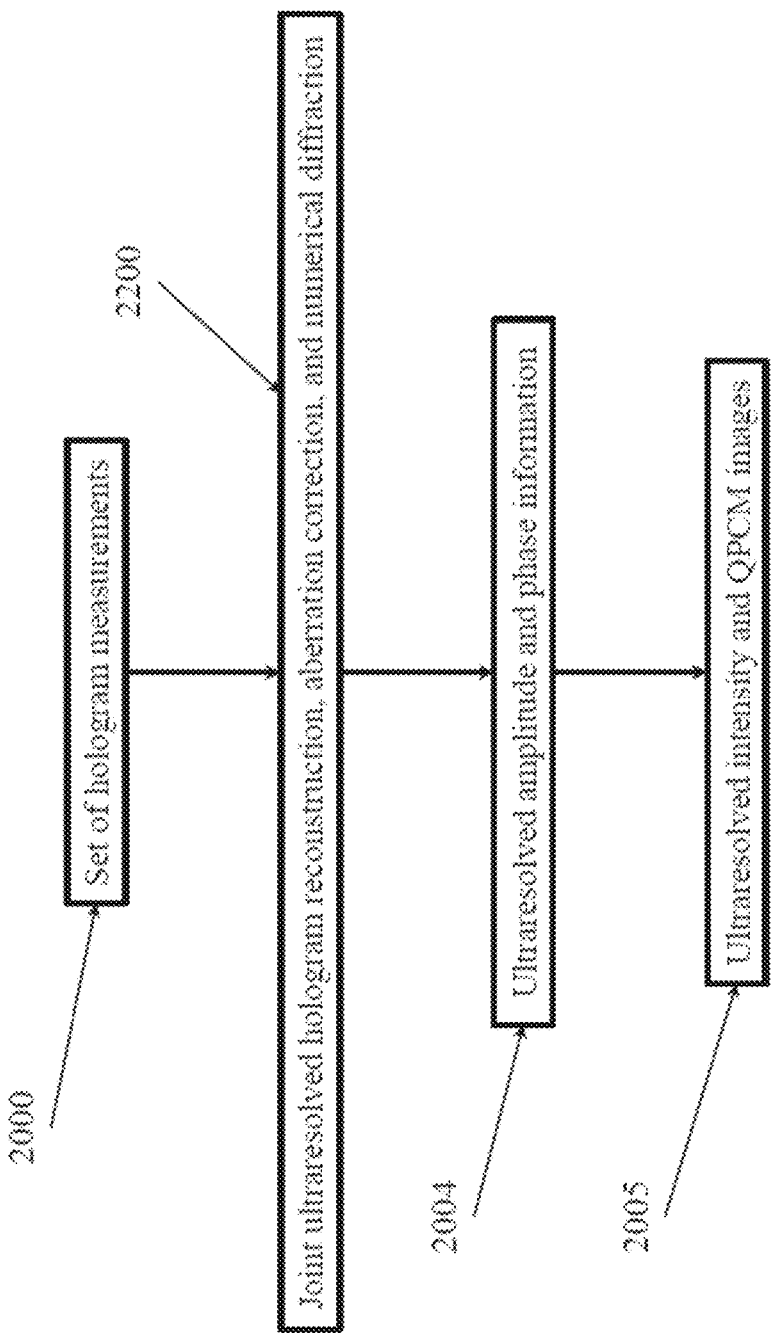
FIG. 14 shows a schematic flow chart of another method for processing a set of hologram measurements to obtain an image in accordance with yet another embodiment.

With reference to FIG. 14, shown is yet another embodiment of the possible algorithmic processing pipelines that can be used for producing ultra-resolved ultra-wide FOV intensity and QPCM images using the USAHM generated data. The set of n holograms captured by the detector at different spatial locations in the scan at a particular wavelength (denoted by $h_1, h_2, \ldots, h_n$) 2000 is used as input to a numerical reconstruction algorithm 2200, which then uses information from the set of holograms and performs joint ultra-resolved hologram reconstruction, aberration correction, and numerical diffraction 2200 to reconstruct ultra-resolved amplitude (intensity) and phase information 2004 at desired axial depths (z) (denoted by $g = \{g_{amplitude}, g_{phase}\}$):

$$g = HAN(h_1, h_2, \ldots, h_n, L, z)$$

where HAN is a joint ultra-resolved hologram reconstruction, aberration correction, and numerical diffraction function, L is the point spread function, and z is the desired axial depth. A possible joint ultra-resolved hologram reconstruction, aberration correction and numerical diffraction function is the following Maximum A Posteriori optimization function:

$$g = \arg\max_g P(g|h_1, h_2, \ldots, h_n, L, z)$$

where $P(g|h_1, h_2, \ldots, h_n, L, z)$ is the posterior probability of g given $h_1, h_2, \ldots, h_n$, L, and z. Note that joint ultra-resolved hologram reconstruction, aberration correction and numerical diffraction is not limited to this function, and other joint ultra-resolved hologram reconstruction, aberration correction and numerical diffraction functions can be used in other embodiments. A numerical reconstruction algorithm is then used to reconstruct 2D/3D ultra-resolved intensity images ($g'_{amplitude}$) and 2D/3D QPCM images ($g'_{QPCM}$) 2005 using the ultra-resolved amplitude and phase information from one or more axial depths $z_1, z_2, \ldots, z_m$ 2004 (m denotes the number of depths):

$$g'_{amplitude} = U(g_{amplitude}(z_1), g_{amplitude}(z_2), \ldots, g_{amplitude}(z_m))$$

$$g'_{QPCM} = V(g_{phase}(z_1), g_{phase}(z_2), \ldots, g_{phase}(z_m))$$

where $g_{amplitude}(z)$ denotes ultra-resolved amplitude information from depth z, $g_{amplitude}(z)$ denotes ultra-resolved phase information from depth z, U is a function for reconstructing 2D/3D ultra-resolved intensity images ($g'_{amplitude}$) from $g_{amplitude}(z_1)$, $g_{amplitude}(z_2)$, ..., $g_{amplitude}(z_m)$, and U is a function for reconstructing 2D/3D QPCM images ($g'_{QPCM}$) from $g_{phase}(z_1)$, $g_{phase}(z_2)$, ..., $g_{phase}(z_m)$. One possible function for U is to interpolate a 3D ultra-resolved intensity image $g'_{amplitude}$ using pixels from $$g'_{amplitude} = \mathrm{interp}(g_{amplitude}(z_1), g_{amplitude}(z_2), \ldots, g_{amplitude}(z_m))$$

where interp(.) is an interpolation function that interpolates pixels in $g'_{amplitude}$ using pixels in $g_{amplitude}(z_1)$, $g_{amplitude}(z_2)$, ..., $g_{amplitude}(z_m)$. One possible function for V is to interpolate a 3D ultra-resolved QPCM image $g'_{QPCM}$ using pixels from $g_{phase}(z_1)$, $g_{phase}(z_2)$, ..., $g_{phase}(z_m)$:

$$g'_{QPCM} = \mathrm{interp}(g_{phase}(z_1), g_{phase}(z_2), \ldots, g_{phase}(z_m))$$

where interp(.) is an interpolation function that interpolates pixels in $g'_{QPCM}$ using pixels in $g_{phase}(z_1)$, $g_{phase}(z_2)$, ..., $g_{phase}(z_m)$. Note that reconstruction is not limited to these methods, and other reconstruction methods can be used in other embodiments. This sequence of algorithms can be performed for each captured wavelength by the present invention to produce multispectral and hyperspectral 2D/3D ultra-resolved intensity images and 2D/3D QPCM images.

It will be appreciated that the present invention is not limited to the aforementioned embodiments of the algorithmic processing pipeline for producing ultra-resolved ultra-wide FOV intensity and QPCM images using the USAHM generated data. Furthermore, in all embodiments, the present invention may also produce 2D/3D visualizations of the multispectral and hyperspectral 2D/3D ultra-resolved ultra-wide FOV intensity images and 2D/3D QPCM images using data fusion methods including Principal Component Analysis, Factor Analysis, Independent Component Analysis, Linear Discriminant Analysis, Local Linear Embedding, Stochastic Neighbor Embedding, Large-Margin Nearest Neighbor, and their variants; note that the data fusion method used in the present invention for producing visualizations are not limited to these data fusion methods and other data fusion methods may be used.

Figure 15:
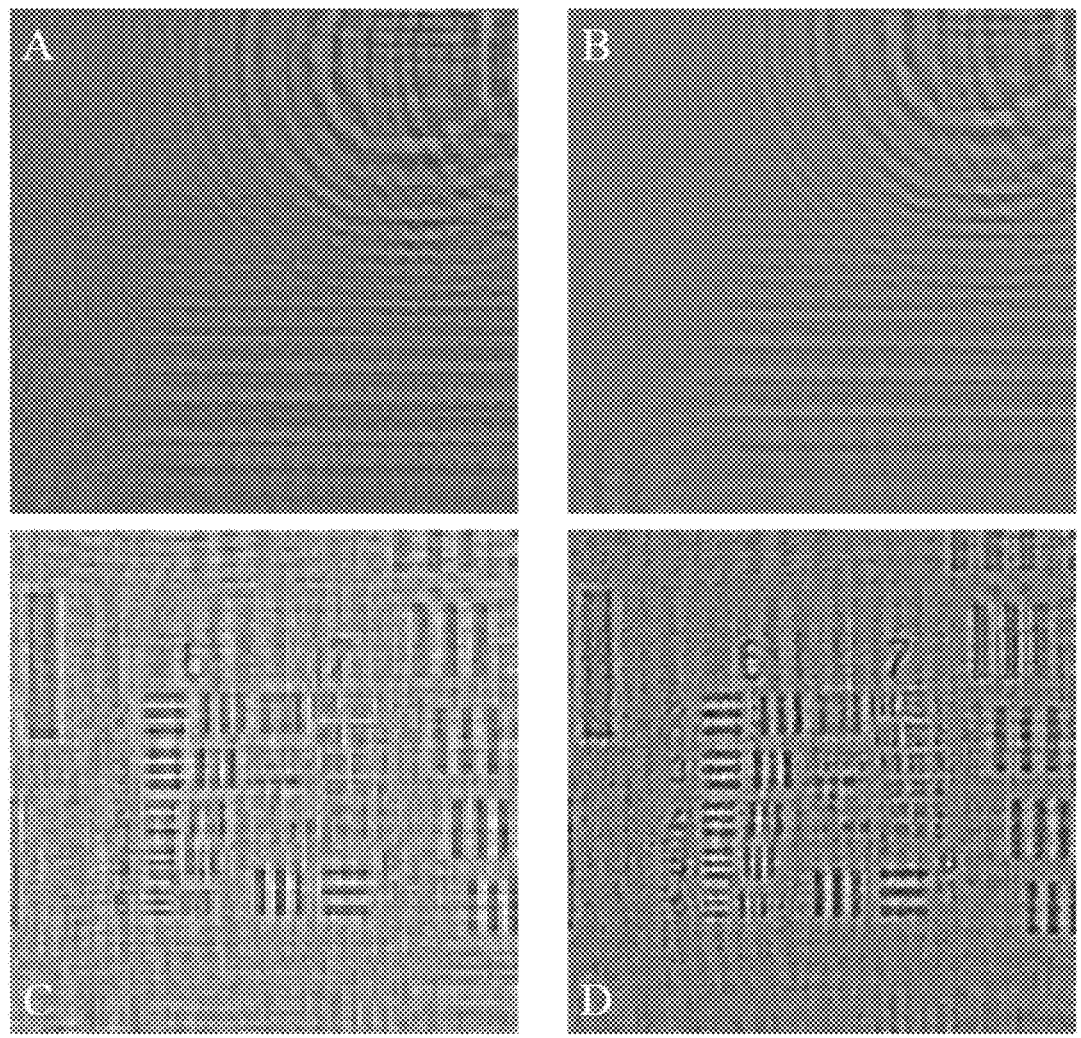
FIG. 15 shows illustrative examples of a processed image showing the results of the processing of a set of hologram measurements.

With reference to FIG. 15, shown are illustrative examples of the results obtained from the present system, method and apparatus. For this example, the embodiment presented earlier in FIG. 6 was used to capture the data. FIG. 15(A) shows a region of a low-resolution hologram of the standard USAF 1951 resolution target and FIG. 15(B) shows the ultra-resolution hologram of the same region constructed using the 43 low-resolution holograms. Note the continuation in the interference pattern as well as the smoothness and completeness of the hologram in FIG. 15(B) as compared to FIG. 15(A). Additionally, FIG. 15(C) is a reconstructed intensity image of a region on the USAF 1951 resolution target using the low-resolution hologram exhibited in FIG. 15(A) and the ultra-resolution hologram exhibited in FIG. 15(B). The most obvious difference between the two intensity images it is the fact that elements up to and including 6-6, 7-1, and 7-2 are resolved in the ultra-resolution image while only elements up to and including 6-5 is resolved in the low-resolution intensity image. The structures in the ultra-resolution image are much smoother than its counterpart and the separation between the dark lines are represented by more pixels, which is a justification for a higher resolution per pixel. In FIG. 15D the separation between the lines of element 7-1 is 3.91 μm, this separation is sampled by 15 pixels which would then result in a per pixel resolution of ~260 nm while still achieving an ultra-wide FOV of ~35 mm².

Figure 16:
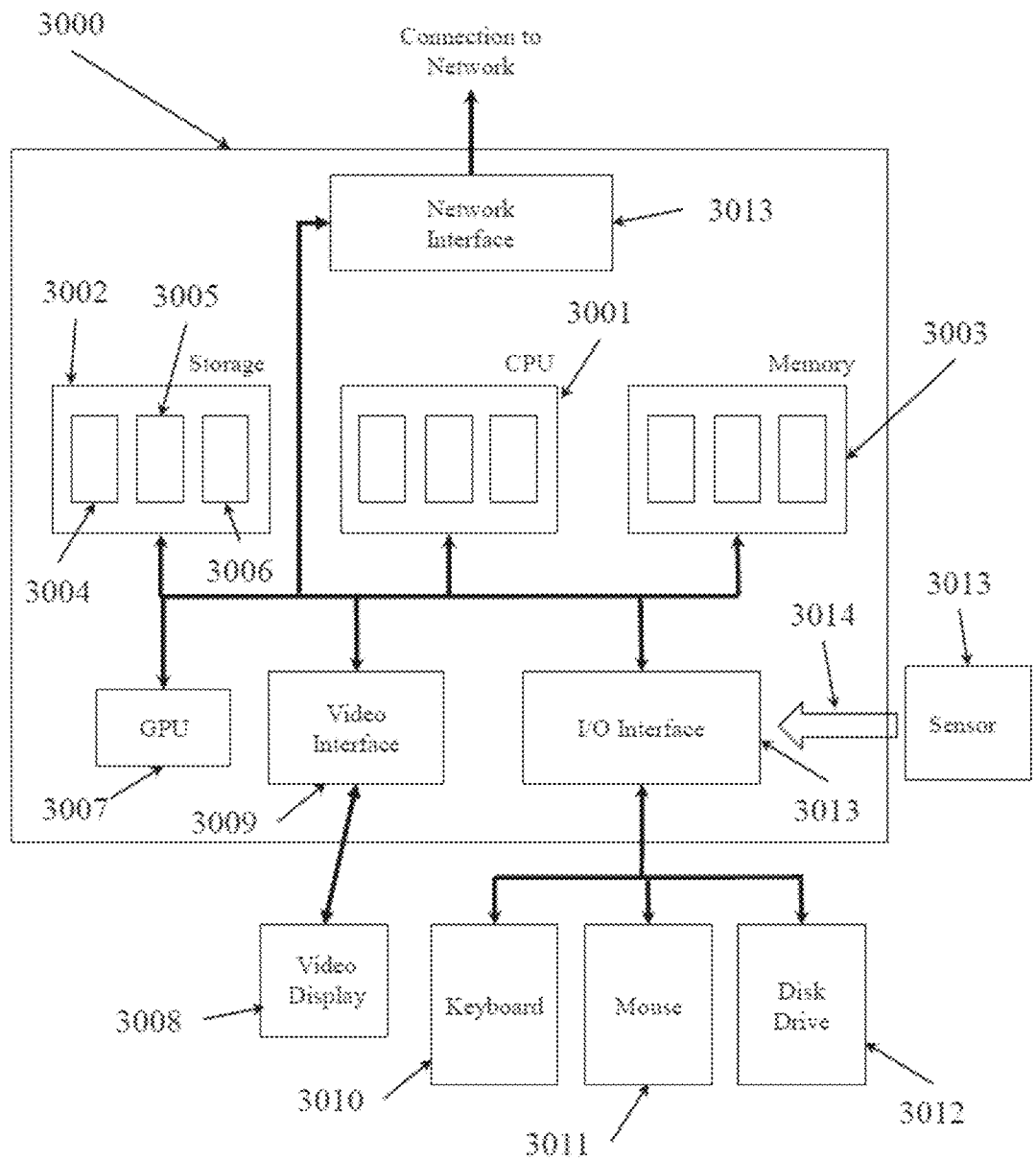
FIG. 16 shows an illustrative example of a generic computing device that may provide a suitable operating environment for one or more embodiments.

Now referring to FIG. 16, shown is a schematic block diagram of a generic computing device. A suitably configured computer device, and associated communications networks, devices, software and firmware may provide a platform for enabling one or more embodiments as described above. By way of example, FIG. 10 shows a generic computer device 3000 that may include a central processing unit ("CPU") 3002 connected to a storage unit 3004 and to a random access memory 3006. The CPU 3002 may process an operating system 3001, application program 3003, and data 3023. The operating system 3001, application program 3003, and data 3023 may be stored in storage unit 3004 and loaded into memory 3006, as may be required. Computer device 3000 may further include a graphics processing unit (GPU) 3022 which is operatively connected to CPU 3002 and to memory 3006 to offload intensive image processing calculations from CPU 3002 and run these calculations in parallel with CPU 3002. An operator 3001 may interact with the computer device 3000 using a video display 3008 connected by a video interface 3005, and various input/output devices such as a keyboard 3010, pointer 3012, and storage 3014 connected by an I/O interface 3009. In known manner, the pointer 3012 may be configured to control movement of a cursor or pointer icon in the video display 3008, and to operate various graphical user interface (GUI) controls appearing in the video display 3008. The computer device 3000 may form part of a network via a network interface 3011, allowing the computer device 3000 to communicate with other suitably configured data processing systems or circuits. One or more different types of sensors 3030 connected via a sensor interface 3032 may be used to search for and sense input from various sources. The sensors 1030 may be built directly into the generic computer device 3000, or optionally configured as an attachment or accessory to the generic computer device 3000.

Thus, in an aspect, there is provided a method of performing holographic microscopy and quantitative phase contrast microscopy, comprising: providing a stationary spectral illumination source with capability of central wavelength and spectral bandwidth selection for emission of light at desired wavelengths; acquiring with a detector a plurality of low-resolution holograms of an image subject from incremental locations utilizing a subpixel sensor-scanning synthetic aperture mechanism having one or more detector scanning patterns; processing the acquired holograms utilizing one or more processing algorithms corresponding to the one or more detector scanning patterns used to acquire the holograms; and reconstructing a subpixel ultra-resolution image of the image subject with an effective field-of-view (FOV) larger than the detector based on the plurality of processed low-resolution holograms; whereby, a desired synthetic aperture is achieved without loss of resolution.

In an embodiment, the spectral illumination source comprises one or more of LEDs, laser sources, scanning grating monochrometers, a nano-photonic ring-resonator spectrograph wavelength selector, a broadband light source, and a tunable laser source.

In another embodiment, the method comprises a light wavelength selection mechanism including bandpass spectral filters, acousto-optical and liquid crystal tunable filters, and a dispersing element.

In another embodiment, the plurality of low-resolution holograms comprises algorithmically assembling the plurality of low-resolution holograms utilizing a numerical reconstruction algorithm, in dependence upon the detector scanning pattern used, thereby to create a sub-pixel ultra-resolution image.

In another embodiment, the numerical reconstruction algorithm is adapted to perform aberration correction to reconstruct an ultra-resolved, aberration-corrected hologram.

In another embodiment, the numerical reconstruction algorithm is further adapted to perform numerical diffraction to reconstruct ultra-resolved amplitude and phase information at desired axial depths (Z).

In another embodiment, the numerical reconstruction algorithm is further adapted to reconstruct 2D/3D ultra-resolved intensity images and 2D/3D quantitative phase contrast microscopy (QPCM) images using the ultra-resolved amplitude and phase information from one or more axial depths.

In another embodiment, the one or more detector scanning patterns includes one or more of translational, radial, polar rotational or random scanning of the image subject.

In another embodiment, the subpixel sensor-scanning synthetic aperture mechanism is capable of motion in lateral X and Y directions, an axial Z direction, and rotation about a defined axis.

In another embodiment, the subpixel sensor-scanning synthetic aperture mechanism is capable of concurrent motion in more than one direction.

In another embodiment, the detector is adapted to capture images at different and selectable spectral bands comprising a central wavelength and spectral bandwidth of the spectral illumination source.

In another embodiment, the method further comprises placing a microscope objective lens above the detector to locate a focal point of the microscope objective lens at a surface of a microscope slide or on a screen which is displaying an interferometric diffraction pattern of the sample.

In another aspect, there is provided an apparatus for performing holographic microscopy and quantitative phase contrast microscopy, comprising: a spectral illumination source with capability of central wavelength and spectral bandwidth selection, the spectral illumination source adapted to illuminate a target through an illumination aperture or via a waveguide; a detector mounted on a movable scanning platform for acquiring a plurality of low-resolution holograms of an image subject from incremental locations utilizing a subpixel sensor-scanning synthetic aperture mechanism having one or more detector scanning patterns; a sample handling platform adapted to securely and accurately position a sample along an optical axis of the system between the illumination source and the detector; a processing unit adapted to reconstruct a subpixel ultra-resolution image of the image subject with an effective field-of-view (FOV) larger than the detector based on the plurality of processed low-resolution holograms; whereby, the apparatus achieves a desired synthetic aperture is achieved without loss of resolution.

In an embodiment, the spectral illumination source comprises one or more of LEDs, laser sources, scanning grating monochrometers, a nano-photonic ring-resonator spectrograph wavelength selector, a broadband light source, and a tunable laser source.

In another embodiment, the apparatus further comprises a light wavelength selection mechanism including bandpass spectral filters, acousto-optical and liquid crystal tunable filters, and a dispersing element.

In another embodiment, the spectral illumination source comprises one or more light-emitting diodes (LEDs) or Halogen or Halogen-Tungsten or a Xenon lamp, with or without narrow bandpass spectral transmission filters, which may be turned on simultaneously or sequentially.

In another embodiment, the spectral illumination source comprises one or more laser sources that may be turned on simultaneously or sequentially.

In another embodiment, the apparatus further comprises one or more scanning grating monochrometers for wavelength selection, in which the grating is placed on a rotational moveable platform in order to superpose a desired central wavelength on the illumination aperture.

In another embodiment, the apparatus further comprises a nano-photonic ring-resonator spectrograph placed directly at the illumination aperture.

In another embodiment, the scanning platform is adapted to move the detector translationally, radially, rotationally or randomly in plurality of incremental positions enabling synthetic aperture scanning.

In another embodiment, the detector is a monochromatic or color charge-coupled device (CCD) or complementary metal-oxide-semiconductor (CMOS) detector.

In another embodiment, the processing unit is adapted to execute processing techniques and algorithms to reconstruct holograms, obtain amplitude and phase information from the holograms, reconstruct amplitude images, and reconstruct quantitative phase contrast microscopy images.

In another embodiment, the apparatus further comprises a microscope objective lens placed above the detector to locate a focal point of the microscope objective lens at the surface of a microscope slide or on a screen which is displaying an interferometric diffraction pattern of the sample.

Although various examples have been described above, it will be appreciated that these illustrative embodiments are not meant to be limiting, and that the scope of the invention is defined by the following claims.

REFERENCES

[1] Gabor D, A New Microscope Principle. *Nature*. 1948; 16: 777-778.
[2] Gabor D, Microscopy by Reconstructed Wavefronts. *Proc. Roy. Soc.* 1949; A197: 454-487.
[3] Kim M K, Digital Holographic Microscopy: Principles, Techniques, and Applications. New York, USA: Springer-Verlag; 2011.
[4] Mudanyali O. Tseng D. Oh C, et al. Compact. Lightweight and Cost-effective Microscope based on Lensless Incoherent Holography for Telemedicine Applications. *Lab on a chip*. 2010, 10(11): 1417-1428.
[5] Bishara W, Sikora U, Mudanyali O, Su T-W, Yaglidere O, Luckhart S, and Ozcan A. Holographic Pixel superresolution in Portable Lensless On-chip Microscopy Using a Fiber-optic Array. *Lab Chip*. 2011; 11: 1276-1279.
[6] Mico V, Zlevsky Z, Garcia-Martinez P, Garcia J. Synthetic Aperture Superresolution with Multiple Off-axis Holograms. *Journal of Optical Society of America*. 2006; 23(12): 3162-3170.
[7] Bishara W, Su T-W, Coskun A F, Ozcan A. Lensfree On-chip Microscopy Over a Wide Field-of-view Using Pixel Superresolution. *Optics Express*. 2010; 18: 11181-11191.
[8] Paturzo M, Ferraro, P. Correct Self-assembling of Spatial Frequencies in Superresolution Synthetic Aperture Digital Holography. *Optics Letters*. 2009; 34: 3650-3652.
[9] Pelagotti A, Paturzo M. Locatelli M. Geltrude A. Meucci R, Finizio A., Ferraro P. An Automatic Method for Assembling a Large Synthetic Aperture Digital Hologram. *Optics Express.* 2012; 20: 4830-4839.

[10] Hardie R C, Barnard K J, Bognar J G, Armstrong E E, Watson E A. High-resolution Image Reconstruction from a Sequence of Rotated and Translated Frames and its Application to an Infrared Imaging System. *Optical Engineering.* 1998; 37: 247.

[11] Luo W, Greenbaum A, Zhang Y, Ozcan A. Synthetic Aperture-based On-chip Microscopy. *Light: Science & Application.* 2015; accepted.

[12] Mico V, Zalevsky Z. Superresolved Digital In-line Holographic Microscopy for High-resolution Lensless Biological Imaging. *Journal of Biomedical Optics* 2010; 15(4): 046027-1-5.

[13] Lai X-J, Tu H-Y, Wu C-H, Lin Y-C, Cheng C-J. Resolution Enhancement of Spectrum Normalization in Synthetic Aperture Digital Holographic Microscopy. *Applied Optics.* 2015; 54(1): A51-A58.

[14] Granero L, Mico V, Zalevsky Z, Garcia J. Synthetic Aperture Superresolved Microscopy in Digital Lensless Fourier Holography by Time and Angular Multiplexing of the Object Information. *Applied Optics.* 2010; 49(5): 845-857.

[15] Cheng C-J, Lai X-J, Lin Y-C, Tu H-Y. Superresolution Imaging in Synthetic Aperture Digital Holographic Microscopy. *IEEE 4th International Conference on Photonics.* 2013; 215-217.

[16] Ralston T S, Marks D L, Carnmey P S, Boppart S A. Interferometric Synthetic Aperture Microscopy. *Nature Physics.* 2007; 3: 129-134.

[17] Hayes M P, Gough Pt. Synthetic Aperture Sonar: A Review of Current Status. *IEEE Journal of Ocean. Engineering.* 2009; 34(3): 207-224.

[18] Robinson S E, Vrba J. Functional Neuroimaging by Synthetic Aperture Magnetometry (SAM). Recent Advances in Biomagnetism. Sendai: Tohoku University Press. 1998; 302-305.

[19] Katz B, Rosen J. Superresolution in Coherent Optical Imaging Using Synthetic Aperture with Fresnel Elements. *Optics Express.* 2010; 18(2): 962-972.

[20] Bayer B. Color imaging array. *American Patent* 555 477, 1976.

[21] Yamaguchi I, Matsumura T, Kato J. Phase-shifting Color Digital Holography. *Optics Letters.* 2002; 27(13): 1108-1110.

[22] Isikman S O, Sencan I, Mudanyali O, Bishara W, Oztoprak C, Ozcan A. Color and Monochrome Lensless On-chip Imaging of Caenorhabditiselegans Over a Wide Field-of-view. *Lab Chip.* 2010; 10: 1109-1112.

[23] Kiss M Z, Nagy B J, Lakatos P, Göröcs Z, TökésS, Wittner B, Orzo L. Special Multicolor Illumination and Numerical Tilt Correction in Volumetric Digital Holographic Microscopy. *Optics Express.* 2014; 22(7): 7559-7573.

[24] Isikman S O, Greenbaum A, Luo W, Coskun A F, Ozcan A. Giga-Pixel Lensfree Holographic Microscopy and Tomography Using Color Image Sensors. *PloS ONE.* 2012; 7(9): e45044.

[25] Greenbaum A, Feizi A, Akbari N, Ozcan A. Wide-field Computational Color Imaging Using Pixel Superresolved On-chip Microscopy. *Optics Express.* 2013; 21(10): 12469-12483.

[26] Greenbaum A, Zhang Y, Feizi A, Chung P-L, Luo W, Kandukuri S, Ozcan A. Wide-field Computational Imaging of Pathology Slides Using Lens-free On-chip Microscopy. *Science Translational Medicine.* 2014; 6(267): 267ra175.

[27] Xia A, Eftekhar A A, Solatani M, Momeni B, Li Q, Chamanzar M, Yegnanarayanan S, Adibi A. High Resolution On-chip Spectroscopy Based on Miniaturized Microdonut Resonators. *Optics Express.* 2011; 19(13): 12356-12364.

The invention claimed is:

1. An apparatus for performing holographic microscopy and quantitative phase contrast microscopy, comprising:
a spectral illumination source with capability of central wavelength and spectral bandwidth selection, the spectral illumination source adapted to illuminate a target through an illumination aperture or via a waveguide;
a detector mounted on a movable scanning platform for acquiring a plurality of low-resolution holograms of an image subject from incremental locations utilizing a subpixel sensor-scanning synthetic aperture mechanism having one or more detector scanning patterns;
a sample handling platform adapted to position: a sample along an optical axis of the system between the illumination source and the detector; and
a processing unit adapted to reconstruct a subpixel ultra-resolution image of the image subject with an effective field-of-view (FOV) larger than the detector based on the plurality of processed low-resolution holograms;
whereby, the apparatus adapted to position: loss of resolution.

2. The apparatus of claim 1, wherein the spectral illumination source comprises one or more of LEDs, laser sources, scanning grating monochrometers, a nano-photonic ring-resonator spectrograph wavelength selector, a broadband light source, and a tunable laser source.

3. The apparatus of claim 2, further comprising a light wavelength selection mechanism including one or more of a bandpass spectral filters, acousto-optical filters, liquid crystal tunable filters, and a dispersing element.

4. The apparatus of claim 1, wherein the spectral illumination source comprises one or more light-emitting diodes (LEDs), Halogen lamp, Halogen-Tungsten lamp, or a Xenon lamp, with or without narrow bandpass spectral transmission filters, which may be turned on simultaneously or sequentially.

5. The apparatus of claim 1, wherein the spectral illumination source comprises one or more laser sources that may be turned on simultaneously or sequentially.

6. The apparatus of claim 1, further comprising one or more scanning grating monochrometers for wavelength selection, in which the grating is placed on a rotational moveable platform in order to superpose a desired central wavelength on the illumination aperture.

7. The apparatus of claim 1, further comprising a nano-photonic ring-resonator spectrograph placed directly at the illumination aperture.

8. The apparatus of claim 1, wherein the scanning platform is adapted to move the detector translationally, radially, rotationally or randomly in plurality of incremental positions enabling synthetic aperture scanning.

9. The apparatus of claim 1, wherein the detector is a monochromatic or color charge-coupled device (CCD) or complementary metal-oxide-semiconductor (CMOS) detector.

10. The apparatus of claim 1, wherein the processing unit is adapted to execute processing techniques and algorithms to reconstruct holograms, obtain amplitude and phase information from the holograms, reconstruct amplitude images, and reconstruct quantitative phase contrast microscopy images.

11. The apparatus of claim 1, further comprising a microscope objective lens placed above the detector to locate a focal point of the microscope objective lens at the surface of a microscope slide or on a screen which is displaying an interferometric diffraction pattern of the sample.

\* \* \* \* \*